US011899464B2

(12) United States Patent
Vora et al.

(10) Patent No.: US 11,899,464 B2
(45) Date of Patent: Feb. 13, 2024

(54) OPERATION OF A VEHICLE USING MOTION PLANNING WITH MACHINE LEARNING

(71) Applicant: Motional AD LLC, Boston, MA (US)

(72) Inventors: Sourabh Vora, Marina Del Ray, CA (US); Oscar Olof Beijbom, Santa Monica, CA (US); Shih-Yuan Liu, Cambridge, MA (US); Tichakorn Wongpiromsarn, Singapore (SG); Daniele De Francesco, Singapore (SG); Scott D. Pendleton, Singapore (SG)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 16/704,366

(22) Filed: Dec. 5, 2019

(65) Prior Publication Data

US 2020/0192391 A1 Jun. 18, 2020

Related U.S. Application Data

(60) Provisional application No. 62/781,573, filed on Dec. 18, 2018.

(51) Int. Cl.
G05D 1/02 (2020.01)
G05D 1/00 (2006.01)
(Continued)

(52) U.S. Cl.
CPC ......... G05D 1/0221 (2013.01); G05D 1/0088 (2013.01); G05D 1/0214 (2013.01);
(Continued)

(58) Field of Classification Search
CPC .. G05D 1/0221; G05D 1/0088; G05D 1/0214; G05D 2201/0213; G08G 1/16;
(Continued)

(56) References Cited

U.S. PATENT DOCUMENTS 9,135,803 B1 * 9/2015 Fields .................... G08B 21/06
9,645,577 B1 * 5/2017 Frazzoli ............ B60W 30/0956
(Continued)

FOREIGN PATENT DOCUMENTS

EP 2848487 3/2015
EP 3647735 5/2020
(Continued)

OTHER PUBLICATIONS

PCT International Preliminary Report on Patentability in International Appln. No. PCT/US2020/064603, dated Jul. 1, 2021, 8 pages.
(Continued)

Primary Examiner — Aniss Chad
Assistant Examiner — Christopher George Fees
(74) Attorney, Agent, or Firm — Fish & Richardson P.C.

(57) ABSTRACT

Techniques for operation of a vehicle using machine learning with motion planning include storing, using one or more processors of a vehicle located within an environment, a plurality of constraints for operating the vehicle within the environment. One or more sensors of the vehicle receive sensor data describing the environment. The one or more processors extract a feature vector from the stored plurality of constraints and the received sensor data. The feature vector includes a first feature describing an object located within the environment. A machine learning circuit of the vehicle is used to generate a first motion segment based on the feature vector. A number of violations of the stored plurality of constraints is below a threshold. The one or more processors operate the vehicle in accordance with the generated first motion segment.

20 Claims, 17 Drawing Sheets

(51) Int. Cl.
*G08G 1/16* (2006.01)
*G01S 17/931* (2020.01)

(52) U.S. Cl.
CPC .............. *G08G 1/16* (2013.01); *G01S 17/931* (2020.01); *G05D 2201/0213* (2013.01)

(58) Field of Classification Search
CPC .. G08G 1/166; G01S 17/931; B60W 60/0011; B60W 60/0015; B60W 40/02; B60W 30/095; G01C 21/3446; G01C 21/3602; G01C 21/36; G01C 21/34
See application file for complete search history.

(56) References Cited

U.S. PATENT DOCUMENTS

| | | | |
|---|---|---|---|
| 10,156,850 | B1 | 12/2018 | Ansari et al. |
| 10,216,189 | B1 | 2/2019 | Haynes |
| 10,860,023 | B2 * | 12/2020 | Di Cairano ............ G08G 1/166 |
| 11,320,826 | B2 | 5/2022 | Vora et al. |
| 11,325,592 | B2 | 5/2022 | Wongpiromsarn et al. |
| 11,352,059 | B2 * | 6/2022 | Balesteros-Tolosana .................... B62D 15/025 |
| 2007/0032952 | A1 | 2/2007 | Carlstedt et al. |
| 2011/0246156 | A1 | 10/2011 | Zecha et al. |
| 2014/0032017 | A1 | 1/2014 | Anderson et al. |
| 2016/0200317 | A1 | 7/2016 | Danzl et al. |
| 2017/0313319 | A1 * | 11/2017 | Kishi .................... B60W 10/18 |
| 2018/0141545 | A1 | 5/2018 | Freytag |
| 2018/0150081 | A1 * | 5/2018 | Gross .................... G06N 5/045 |
| 2018/0164822 | A1 | 6/2018 | Chu et al. |
| 2018/0204460 | A1 | 7/2018 | Deng et al. |
| 2019/0120640 | A1 | 4/2019 | Ho et al. |
| 2019/0243371 | A1 * | 8/2019 | Nister .................. G05D 1/0231 |
| 2020/0089232 | A1 * | 3/2020 | Gdalyahu ............ B60W 60/001 |
| 2020/0125094 | A1 * | 4/2020 | Zhang ............... B60W 50/0098 |
| 2020/0130703 | A1 * | 4/2020 | Pendelton .............. G06V 40/18 |
| 2020/0132488 | A1 * | 4/2020 | Slutskyy ............ B60W 60/0011 |
| 2020/0133280 | A1 * | 4/2020 | Seccamonte ...... B60W 60/0027 |
| 2020/0166361 | A1 | 5/2020 | Voznesensky et al. |
| 2020/0189575 | A1 | 6/2020 | Wongpiromsarn et al. |
| 2021/0255635 | A1 | 8/2021 | Vora et al. |
| 2022/0043456 | A1 | 2/2022 | Shalev-Shwartz et al. |
| 2022/0227365 | A1 | 7/2022 | Wongpiromsarn et al. |
| 2022/0283586 | A1 | 9/2022 | Vora et al. |

FOREIGN PATENT DOCUMENTS

| | | |
|---|---|---|
| EP | 3870491 | 9/2021 |
| JP | 2009-101733 | 5/2009 |
| JP | 2009-137410 | 6/2009 |
| JP | 2012-116366 | 6/2012 |
| JP | 2016-007989 | 1/2016 |
| JP | 2017-518913 | 7/2017 |
| JP | 2017-154725 | 9/2017 |
| JP | 2018-008575 | 1/2018 |
| KR | 10-2014-0007444 | 1/2014 |
| KR | 10-1610544 | 4/2016 |
| KR | 10-2018-0109190 | 10/2018 |
| WO | WO 2011009009 | 1/2011 |
| WO | WO 2020119004 | 6/2020 |

OTHER PUBLICATIONS

[No Author Listed] "SAE International: Surface Vehicle Recommended Practice Taxonomy and Definitions for Terms Related to Driving Automation Systems for On-Road Moto Vehicles," dated Sep. 30, 2016, 30 pages.

U.S. Appl. No. 16/702,620, filed Dec. 4, 2019, Wongpiromsarn et al.

PCT International Search Report and Written Opinion in International Appln. No. PCT/US2019/064603, dated Apr. 8, 2020, 13 pages.

Hegedus et al., "Hybrid Trajectory Planning for Autonomous Vehicles using Neural Networks," 18th IEEE International Symposium on Computational Intelligence and Informatics, Nov. 21-22, 2018, pp. 25-30.

* cited by examiner

1600

Store, using one or more processors of a vehicle located within an environment, a plurality of constraints for operating the vehicle within the environment
1604

Receive, using one or more sensors of the vehicle, sensor data describing the environment
1608

Extract, using the one or more processors, a feature vector from the stored plurality of constraints and the received sensor data, wherein the feature vector comprises a first feature describing an object located within the environment
1612

Generate, using a machine learning circuit of the vehicle, a first motion segment based on the feature vector, such that a number of violations of the stored plurality of constraints is below a threshold
1616

Operate, using the one or more processors, the vehicle in accordance with the generated first motion segment
1620

Store, using one or more processors of a vehicle, a plurality of constraints for operating the vehicle
1704

Receive, using the one or more processors, a plurality of motion segments for operating the vehicle, wherein at least a first motion segment of the plurality of motion segments comprises a distance for the vehicle to travel
1708

For each motion segment of the received plurality of motion segments, determine a corresponding number of violations of the stored plurality of constraints
1712

Generate, using a machine learning circuit, a second motion segment from the stored plurality of constraints and the received plurality of motion segments, wherein a number of violations of the stored plurality of constraints for the second motion segment is lower than the corresponding number of violations of the stored plurality of constraints for each motion segment of the received plurality of motion segments
1716

Operate, using the one or more processors, the vehicle in accordance with the second motion segment
1720

FIG. 17

OPERATION OF A VEHICLE USING MOTION PLANNING WITH MACHINE LEARNING

CROSS-REFERENCE TO RELATED APPLICATION

This application claims the benefit of U.S. Provisional Application 62/781,573, filed on Dec. 18, 2018, which is incorporated herein by reference in its entirety.

FIELD OF THE INVENTION

This description relates generally to operation of vehicles and specifically to operation of a vehicle using motion planning with machine learning.

BACKGROUND

Navigation of a vehicle from an initial location to a final destination often requires a user or the vehicle's decision-making system to select a route through a road network from the initial location to a final destination. The route may involve meeting objectives such as not exceeding a maximum driving time. However, a complex route can require many decisions, making traditional algorithms for route selection impractical. Traditional greedy algorithms are sometimes used to select a route across a directed graph from the initial location to a final destination. However, if a large number of other vehicles on the road use such a greedy algorithm, the selected route may become overloaded and travel may slow to a crawl. In addition, the presence of parked vehicles, construction zones, and pedestrians complicate route selection and navigation.

SUMMARY

Techniques are provided for operation of a vehicle using motion planning (e.g., minimum-violation motion planning) with machine learning. The techniques include storing, using one or more processors of a vehicle located within an environment, a plurality of constraints for operating the vehicle within the environment. One or more sensors of the vehicle receive sensor data describing the environment. The one or more processors extract a feature vector from the stored plurality of constraints and the received sensor data. The feature vector includes a first feature describing an object located within the environment. A machine learning circuit of the vehicle is used to generate a first motion segment based on the feature vector. A number of violations of the stored plurality of constraints is below a threshold. The one or more processors operate the vehicle in accordance with the generated first motion segment.

The techniques further include storing, using the one or more processors, a plurality of constraints for operating the vehicle. The one or more processors receive a plurality of motion segments for operating the vehicle. At least a first motion segment of the plurality of motion segments includes a distance for the vehicle to travel. For each motion segment of the received plurality of motion segments, a corresponding number of violations of the stored plurality of constraints is determined. A machine learning circuit generates a second motion segment from the stored plurality of constraints and the received plurality of motion segments. A number of violations of the stored plurality of constraints for the second motion segment is lower than the corresponding number of violations of the stored plurality of constraints for each motion segment of the received plurality of motion segments. The vehicle is operated in accordance with the second motion segment.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 16 illustrates a process for operation of a vehicle using motion planning with machine learning, in accordance with one or more embodiments.

FIG. 17 illustrates an alternate process for operation of a vehicle using motion planning with machine learning, in accordance with one or more embodiments.

DETAILED DESCRIPTION

Figure 1:
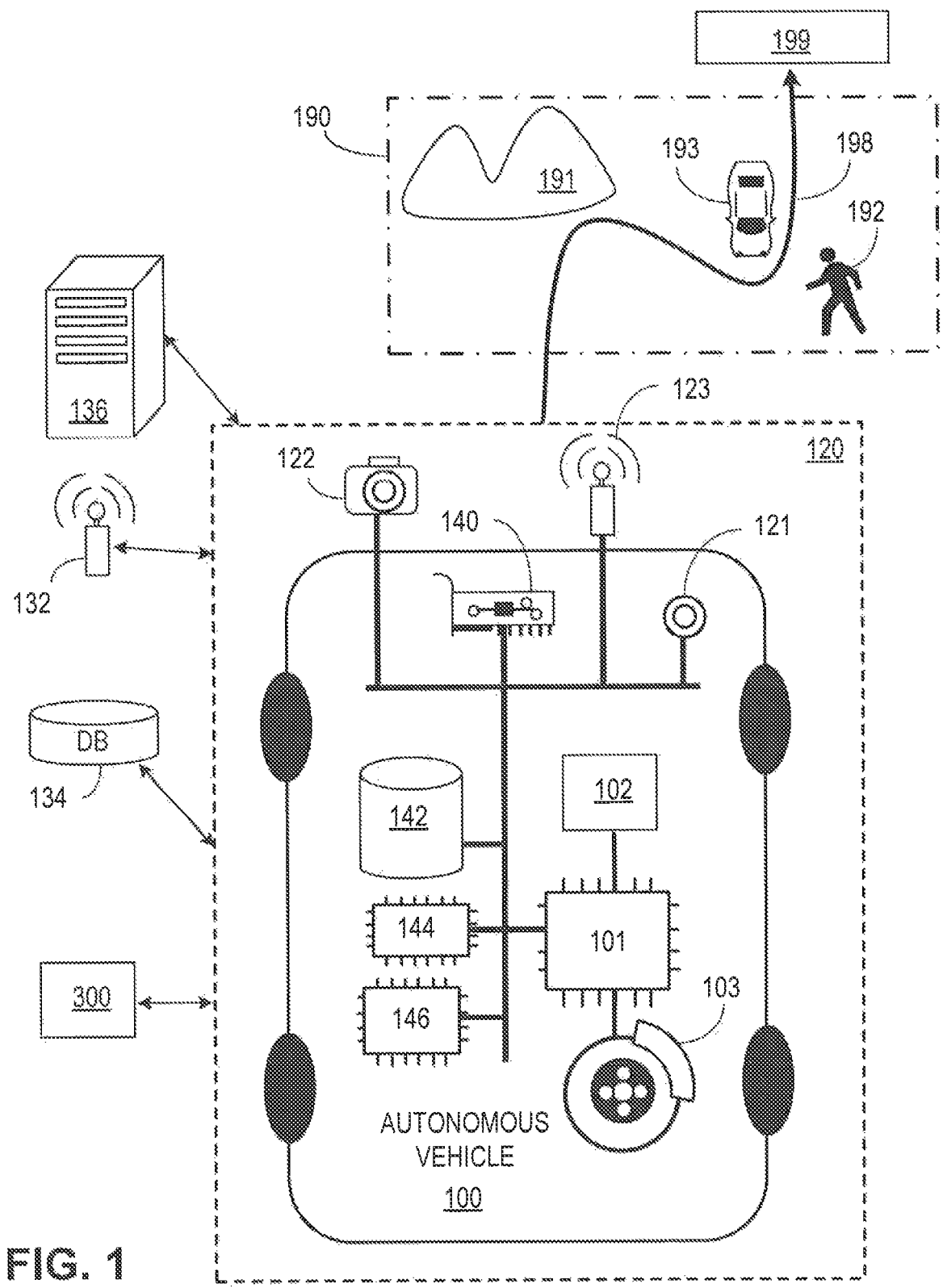
FIG. 1 illustrates an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Operating Environment for Motion Planning with Machine Learning
8. Example of Constraint Violation for Collision Avoidance
9. Machine Learning Architecture for Motion Planning
10. Processes for Operation of a Vehicle with Motion Planning General Overview An autonomous vehicle (AV) uses sensors to detect objects and determine distances from objects during operation within an environment. The sensors include visual sensors such as cameras and LiDARs. A LiDAR is a remote sensing device that uses a grid of pulsed laser beams to measure a distance from an object to the device. To operate the AV, the visual sensors of the AV are used to receive sensor data representing the environment. One or more processors of the AV are used to store constraints for operating the vehicle within the environment. For example, a constraint may specify a maximum speed for the AV. The processors extract a feature vector from the constraints and the received sensor data. The feature vector includes a first feature describing an object located within the environment. For example, the first feature may describe a position or a speed of the object. A machine learning circuit of the vehicle is used to generate a first motion segment based on the feature vector. The first motion segment is generated, such that a number of violations of the constraints for the first motion segment is below a threshold. The one or more processors operate the vehicle in accordance with the generated first motion segment.

System Overview

FIG. 1 illustrates an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are GNSS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WIMAX™, Wi-Fi, BLUETOOTH™, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
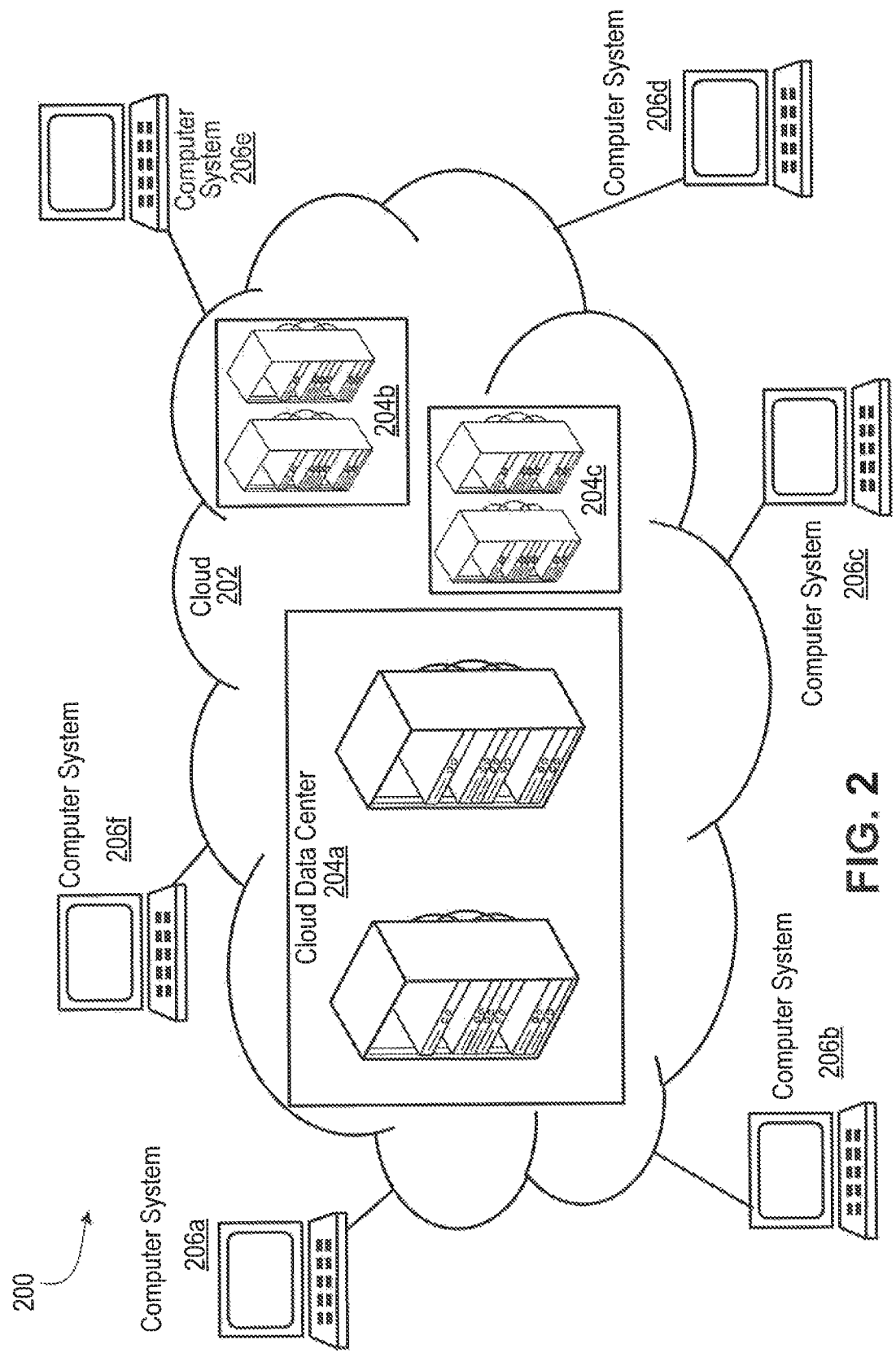
FIG. 2 illustrates an example "cloud" computing environment, in accordance with one or more embodiments.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
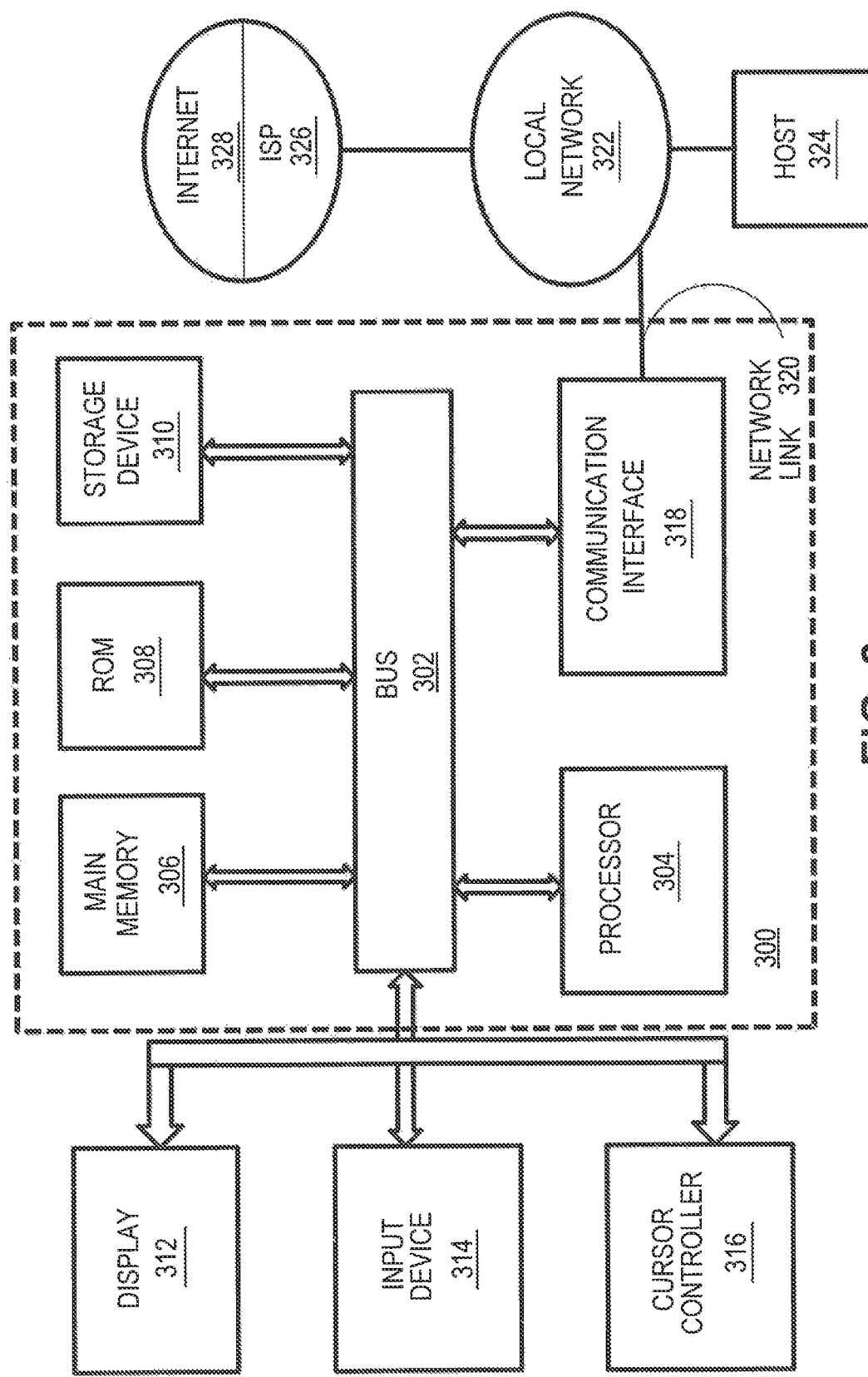
FIG. 3 illustrates a computer system, in accordance with one or more embodiments.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
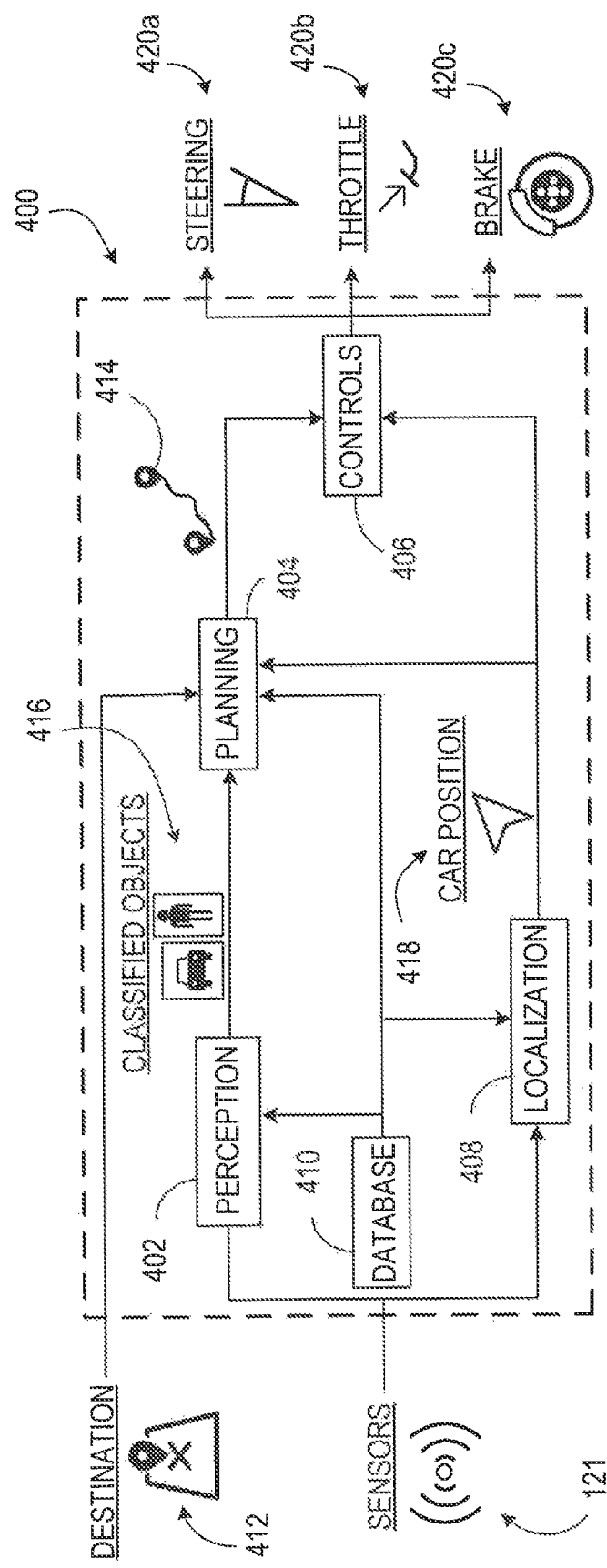
FIG. 4 illustrates an example architecture for an AV, in accordance with one or more embodiments.

FIG. 4 illustrates an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
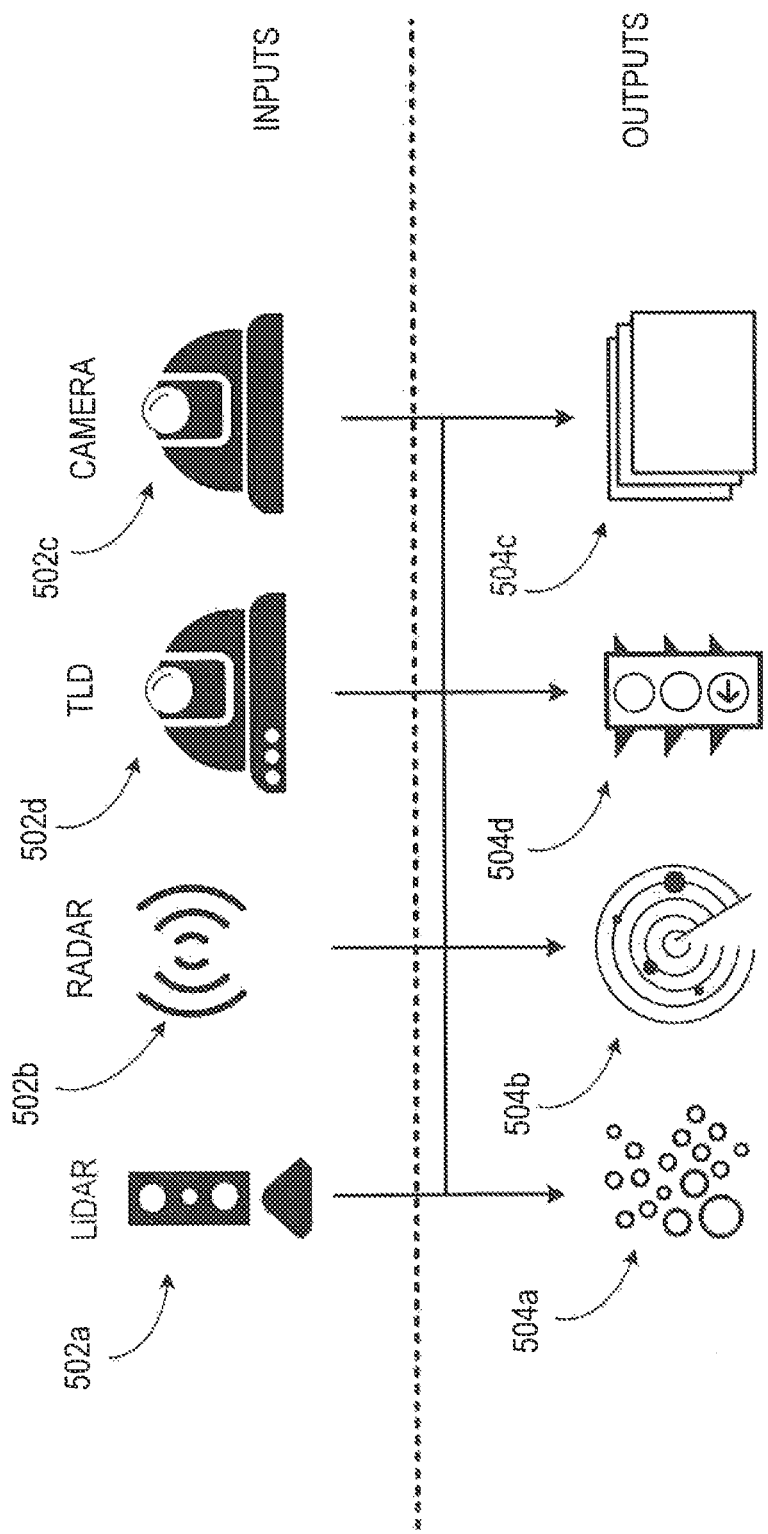
FIG. 5 illustrates an example of inputs and outputs that may be used by a perception module, in accordance with one or more embodiments.

FIG. 5 illustrates an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504*a-d* are combined using a sensor fusion technique. Thus, either the individual outputs 504*a-d* are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
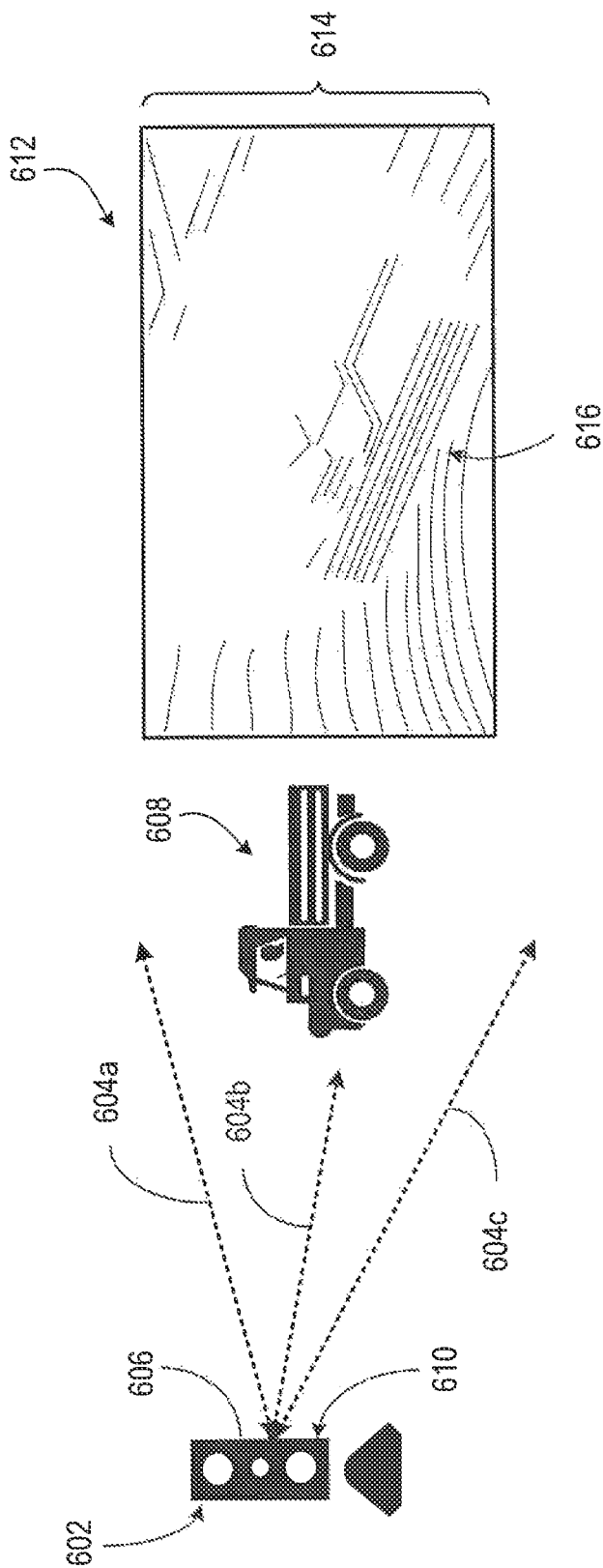
FIG. 6 illustrates an example of a LiDAR system, in accordance with one or more embodiments.

FIG. 6 illustrates an example of a LiDAR system 602 (e.g., the input 502*a* shown in FIG. 5). The LiDAR system 602 emits light 604*a-c* from a light emitter 606 (e.g., a laser transmitter). Light emitted by a LiDAR system is typically not in the visible spectrum; for example, infrared light is often used. Some of the light 604*b* emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
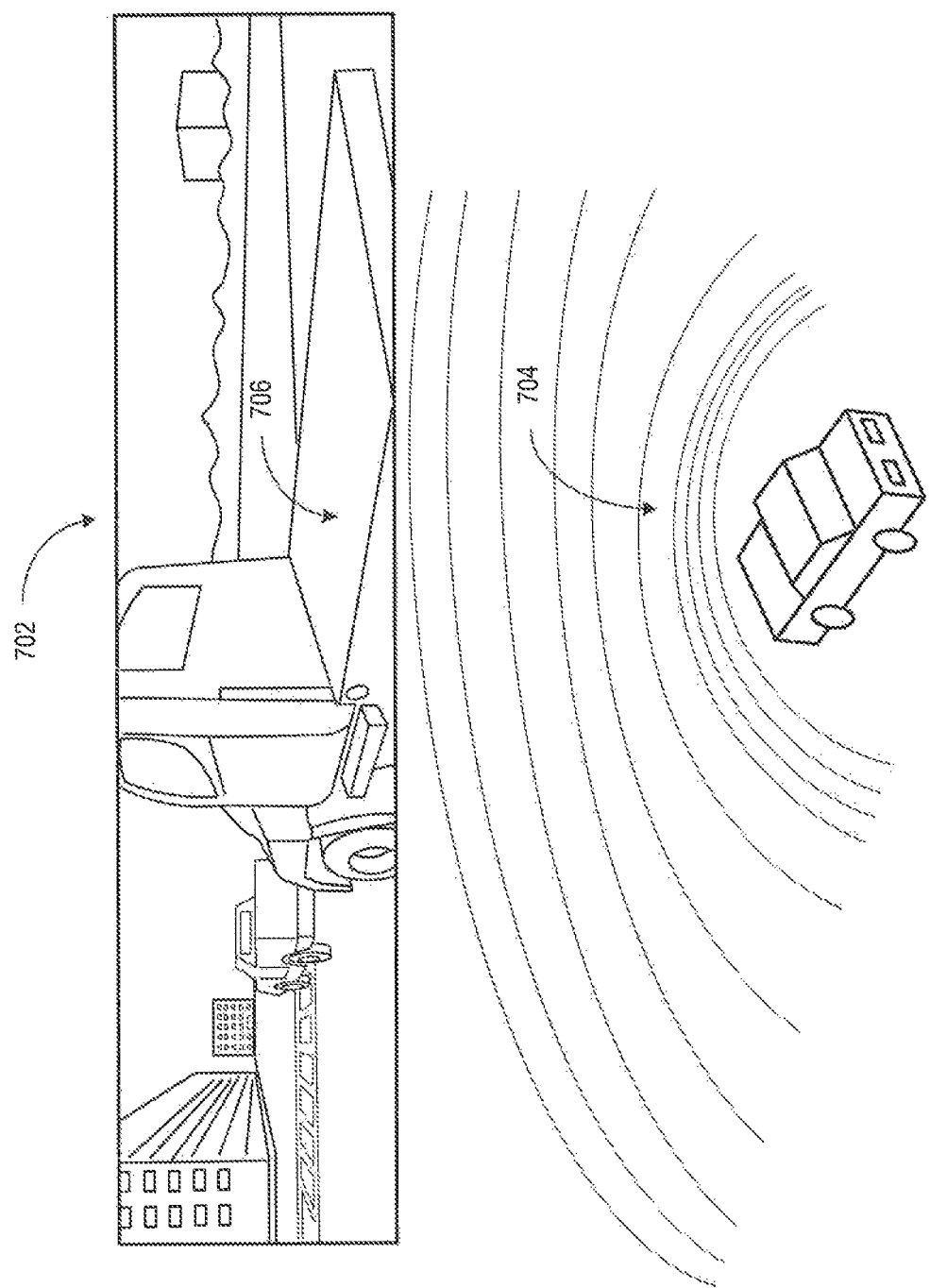
FIG. 7 illustrates the LiDAR system in operation, in accordance with one or more embodiments.

FIG. 7 illustrates the LiDAR system 602 in operation. In the scenario shown in this figure, the AV 100 receives both camera system output 504*c* in the form of an image 702 and LiDAR system output 504*a* in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
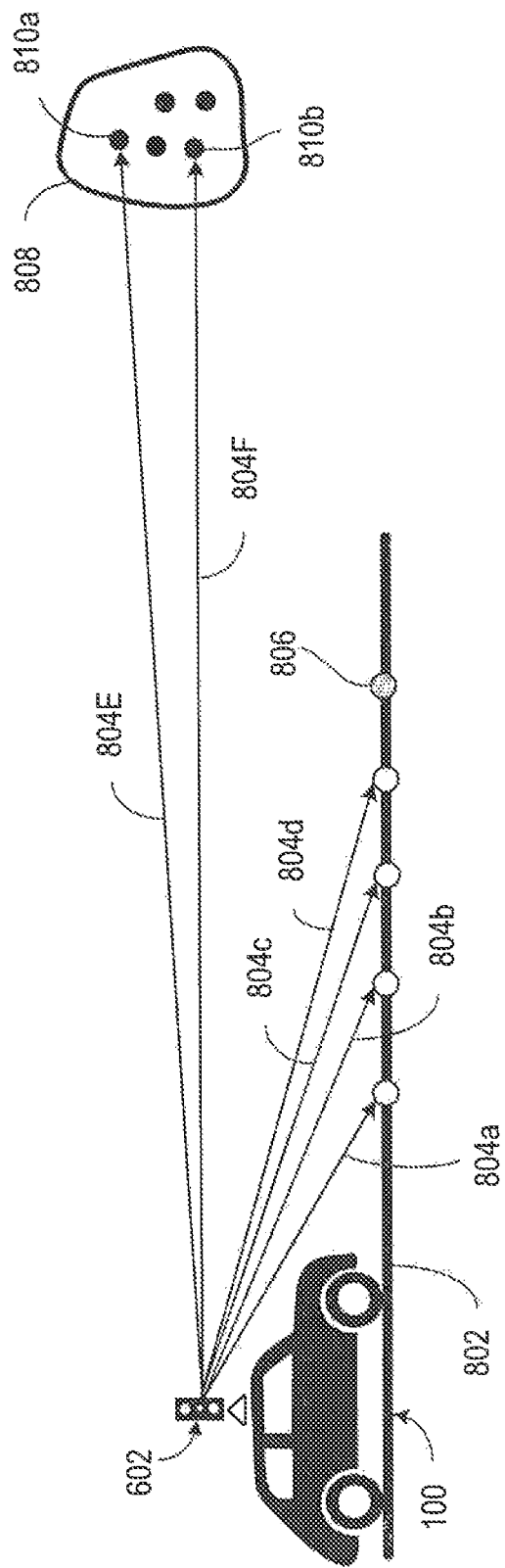
FIG. 8 illustrates the operation of the LiDAR system in additional detail, in accordance with one or more embodiments.

FIG. 8 illustrates the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804*a-d* emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804*e-f* emitted by the LiDAR system 602 will be reflected from points 810*a-b* in a manner inconsistent with the expected consistent manner. From this information, the AV 100 can determine that the object 808 is present.

Path Planning

Figure 9:
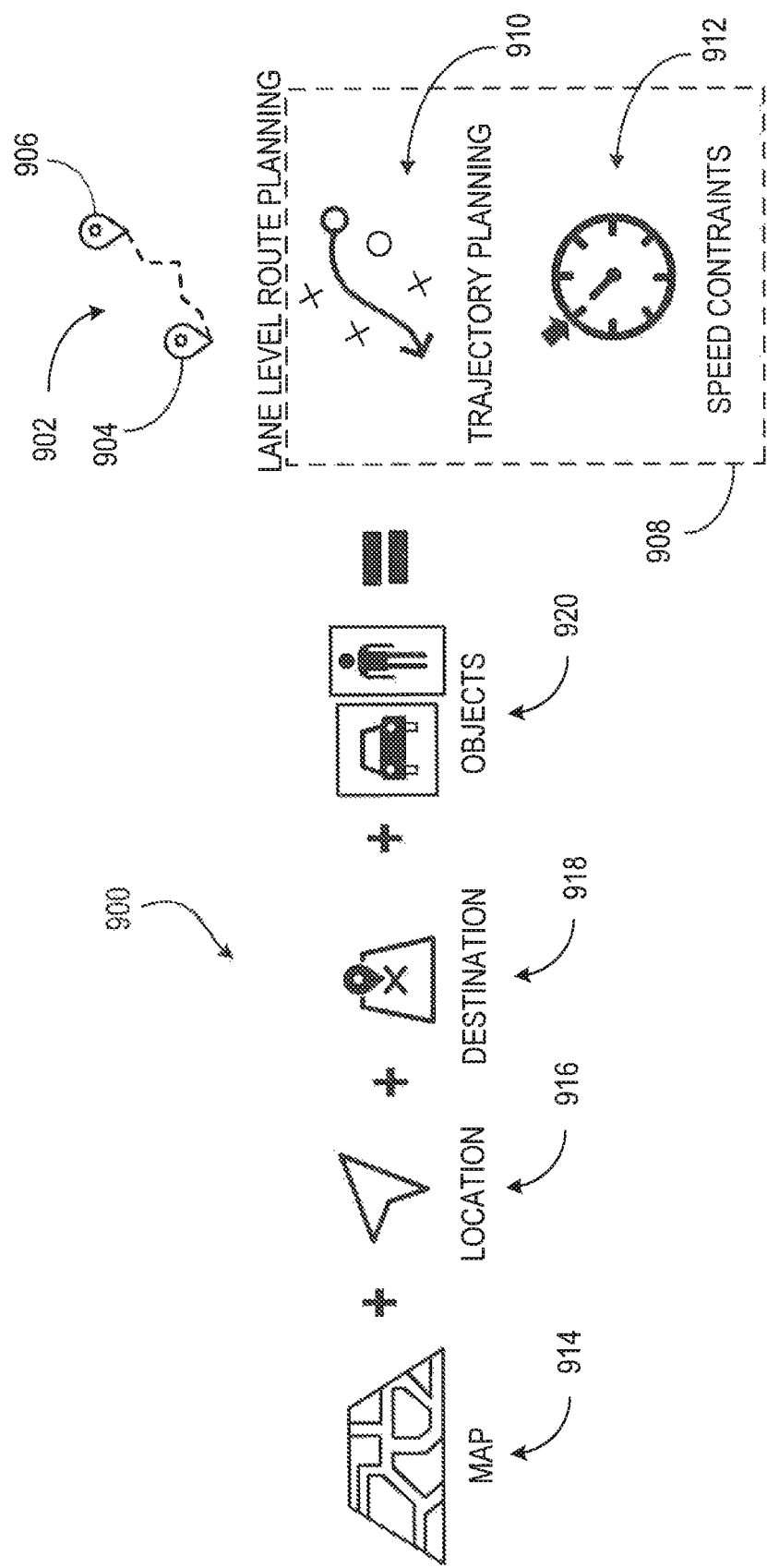
FIG. 9 illustrates a block diagram of the relationships between inputs and outputs of a planning module, in accordance with one or more embodiments.

FIG. 9 illustrates a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
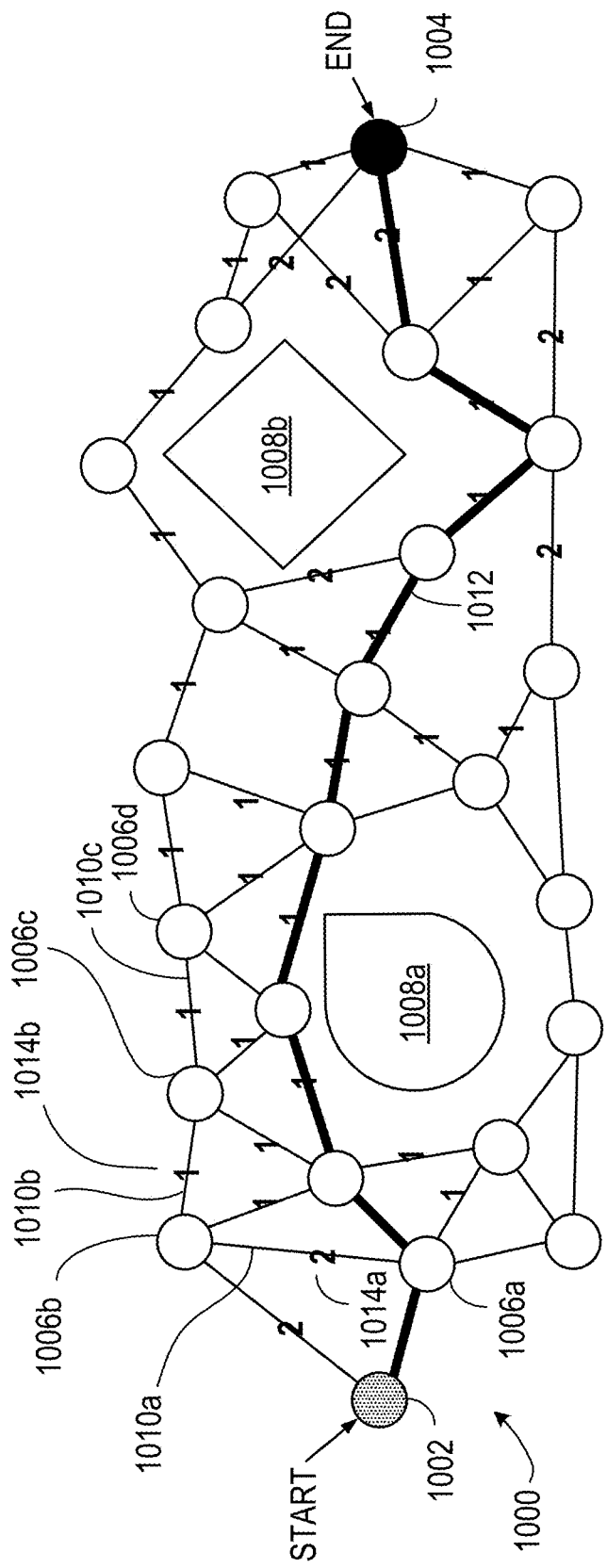
FIG. 10 illustrates a directed graph used in path planning, in accordance with one or more embodiments.

FIG. 10 illustrates a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006*a-d* representing different locations between the start point 1002 and the end point 1004 that could be occupied by an AV 100. In some examples, e.g., when the start point 1002 and end point 1004 represent different metropolitan areas, the nodes 1006*a-d* represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
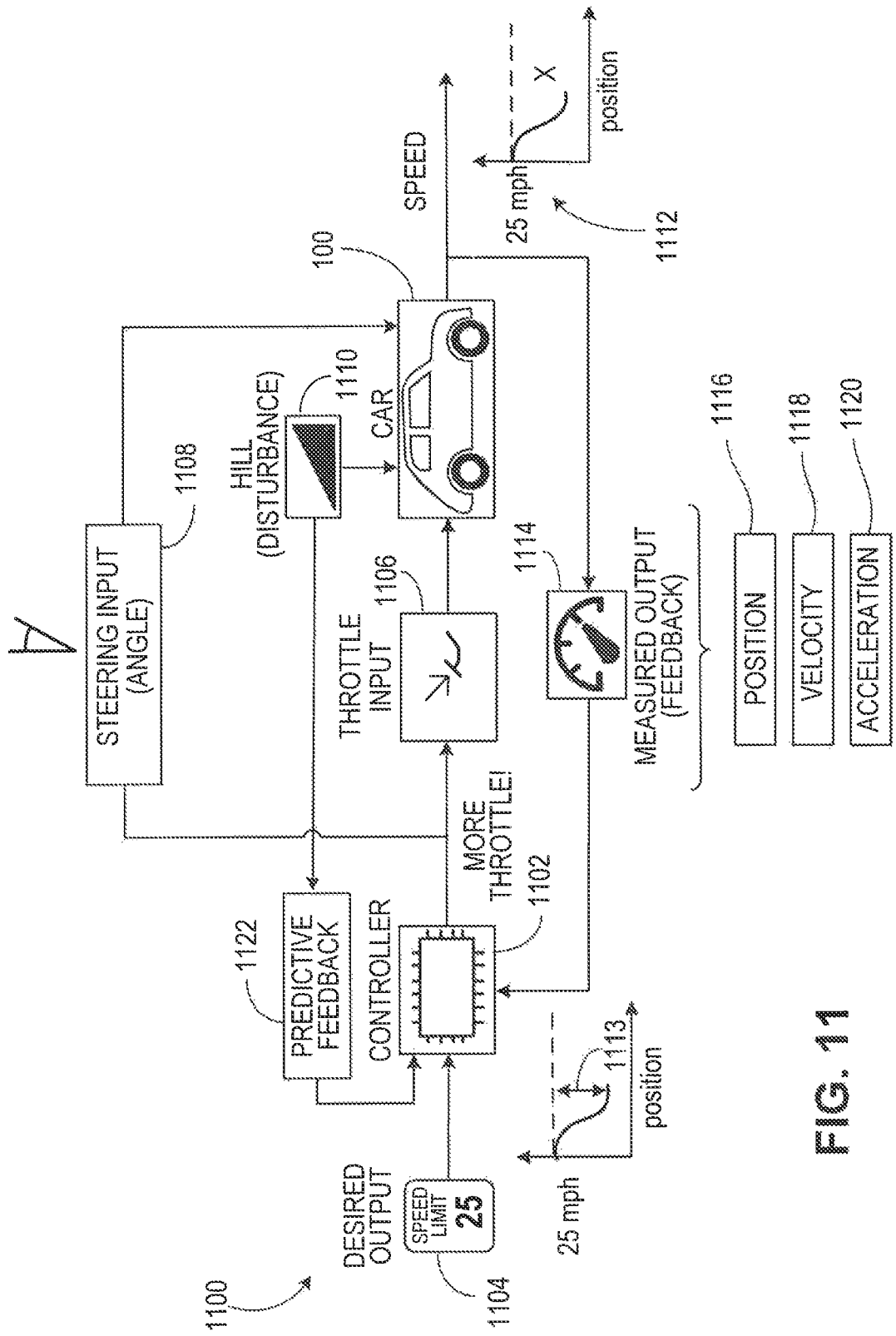
FIG. 11 illustrates a block diagram of the inputs and outputs of a control module, in accordance with one or more embodiments.

FIG. 11 illustrates a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
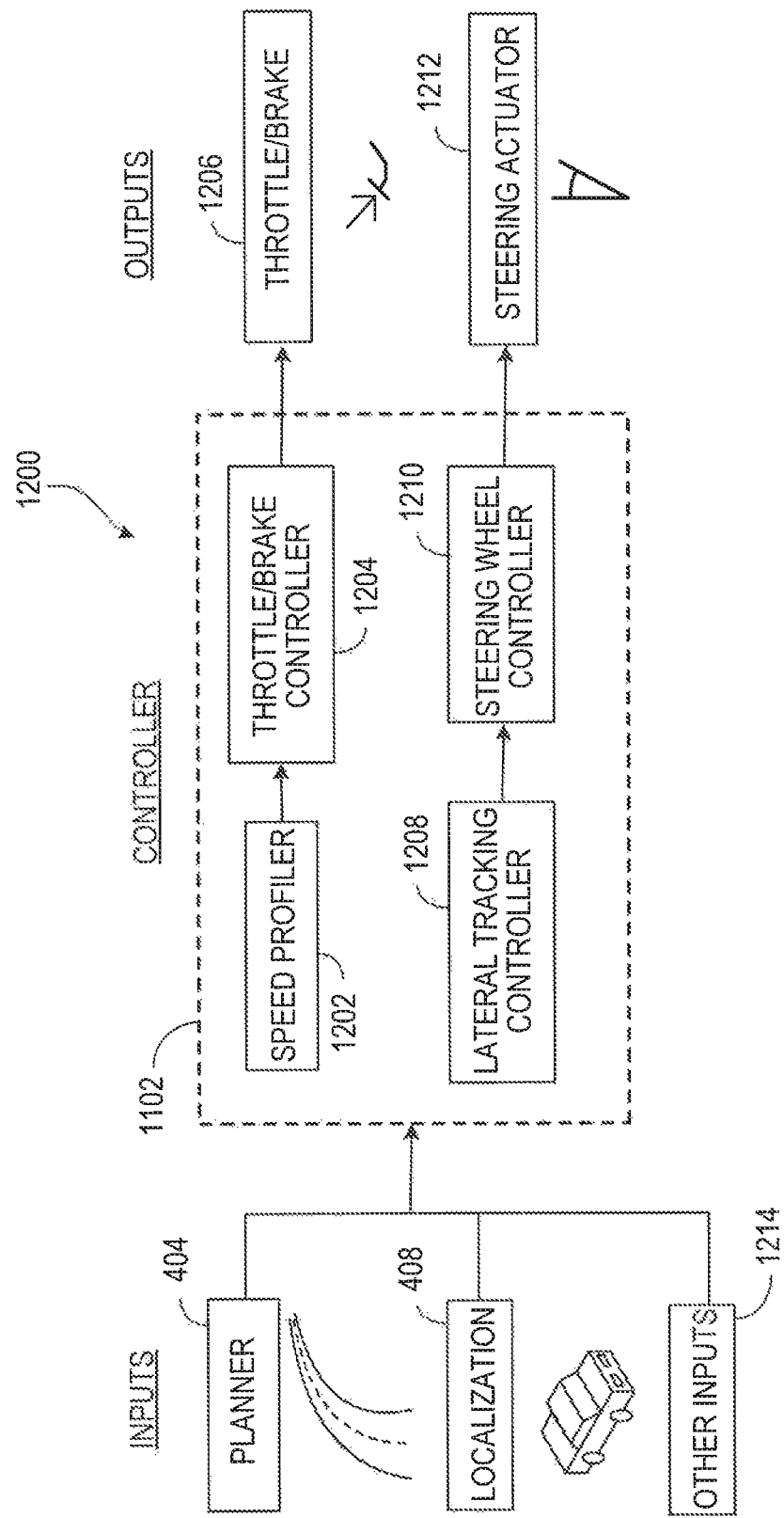
FIG. 12 illustrates a block diagram of the inputs, outputs, and components of a controller, in accordance with one or more embodiments.

FIG. 12 illustrates a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Operating Environment for Motion Planning Using Machine Learning

Figure 13:
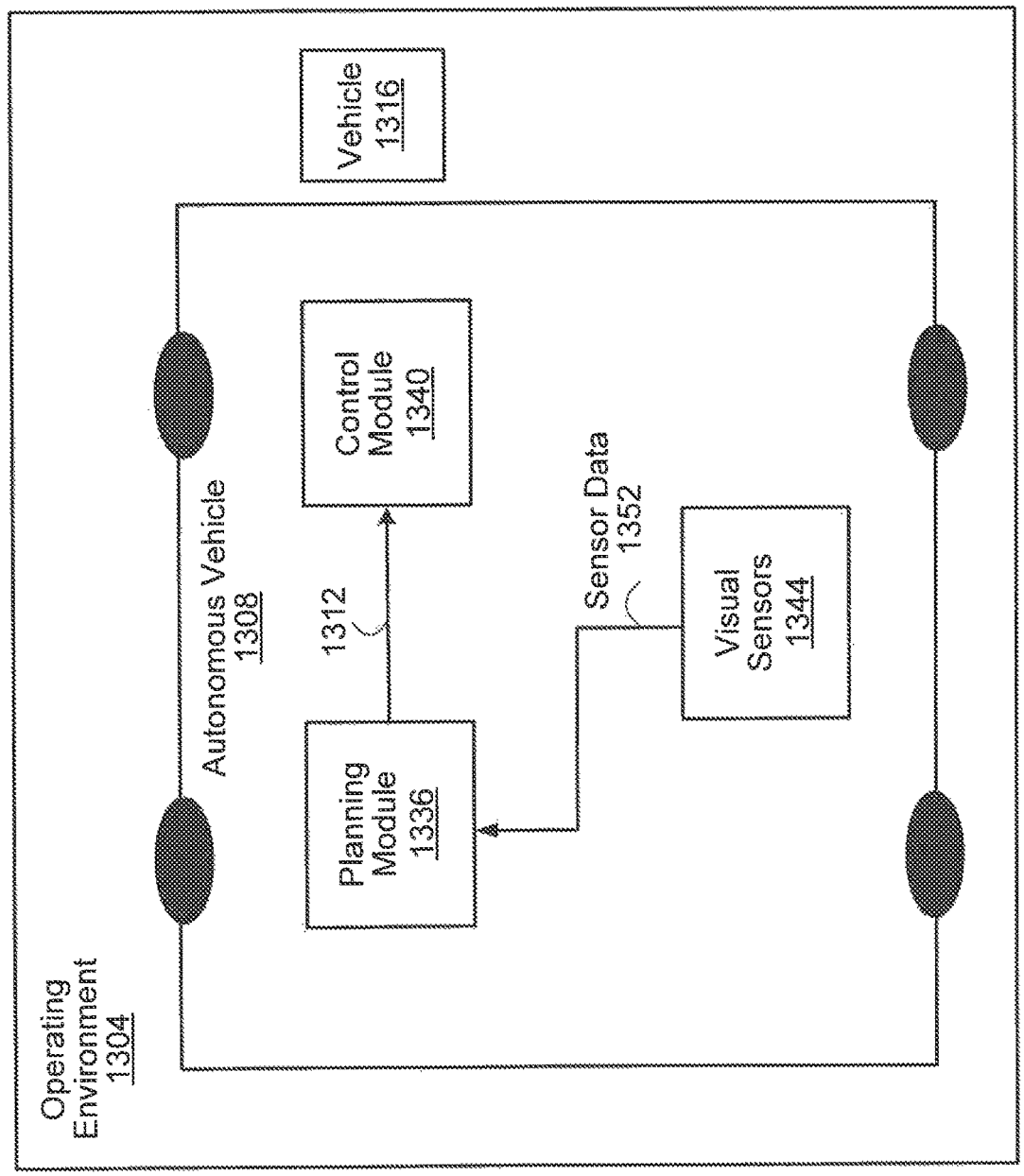
FIG. 13 illustrates a block diagram of an operating environment of a vehicle using motion planning with machine learning, in accordance with one or more embodiments.

FIG. 13 illustrates an operating environment 1304 for an AV 1308 using motion planning with machine learning, in accordance with one or more embodiments. The operating environment 1304 includes the AV 1308 and a vehicle 1316. The operating environment 1304 represents a geographical area, such as a state, a town, a neighborhood, or a road network or segment. The operating environment 1304 may be an example of the environment 190 illustrated and described above with reference to FIG. 1. In other embodiments, the operating environment 1304 includes additional objects than those described herein.

The operating environment 1304 includes objects, which are physical entities external to the AV 1308. An object can be static or dynamic. A static object can include but is not limited to: a road segment, a traffic signal, a building, a parking space located on a road segment, a highway exit or entrance ramp, a curb located adjacent to a drivable area, a median separating two lanes of the drivable area, and any other object that does not move within the environment 1304. A dynamic object can include but is not limited to: another vehicle that is not parked, a pedestrian, a cyclist, and any other object that moves within the environment 1304. The vehicle 1316 is an example of a dynamic object.

In driving mode, the AV 1308 uses sensor data 1352, for example, LiDAR data or stereo camera data, to detect and classify or label static objects and dynamic objects in the environment 1304. The classified/labeled objects and their dynamic characteristics if any, for example, positions, velocities, or headings, are used by a planning module 1336 to predict a collision between the AV 1308 and objects (e.g., vehicle 1316) within the operating environment 1304, to generate a safe trajectory through the environment 1304, and to operate the AV 1308 to drive through the operating environment 1304 along the safe trajectory.

While traveling along the trajectory, one or more visual sensors 1344 of the AV 1308 receive sensor data 1352 describing the environment 1304. The visual sensors 1344 sense a state of the environment 1304, such as the presence and structure of the vehicle 1316, and transmit the sensor data 1352 and semantic data representing the state to the planning module 1336. The visual sensors 1344 are communicatively coupled to the planning module 1336 to transmit the sensor data 1352 and semantic data. The visual sensors 1344 include one or more monocular or stereo video cameras in the visible light, infrared or thermal (or both) spectra, LiDAR, RADAR, ultrasonic sensors, time-of-flight (TOF) depth sensors, and may include temperature sensors, humidity sensors, or precipitation sensors. The visual sensors 1344 may be an example of the sensors 122-123 illustrated and described above with reference to FIG. 1.

In one embodiment, the sensor data 1352 includes LiDAR point cloud data or camera images. LiDAR sensors of the AV 1308 are used to illuminate a target, for example, the vehicle 1316, with pulsed laser light and measure the reflected pulses. Differences in laser return times and wavelengths can then be used to generate the sensor data 1352 and create a digital 3-D representation of the vehicle 1316. The structure of the LiDAR point cloud data allows a large amount of raw measurement data to be handled by the planning module 1336.

In one embodiment, the planning module 1336 uses the dynamic characteristics of the vehicle 1316 to estimate a trajectory for the vehicle 1316. The planning module 1336 also estimates a point and time of intersection between the estimated trajectory of the vehicle 1316 and the planned trajectory of AV 1308. The planning module 1336 determines potential behaviors for the vehicle 1316 and assigns probabilities to each potential behavior to determine a likelihood of collision for the AV 1308 with the vehicle 1316.

In addition to determining the trajectories and the intersection point and time, the planning module 1336 stores a plurality of constraints for operating the AV 1308. Each constraint limits the operation of the AV 1308. For example, a constraint may be a maximum speed limit for the AV 1308 based on a traffic rule. Another constraint may specify that the AV 1308 must stop at red lights. The planning module 1336 may receive one or more constraints from the server 136 that are intended to increase a level of passenger comfort measured by passenger sensors of the AV 1308. For example, a constraint may specify a maximum speed or a maximum acceleration of the AV 1308 associated with a level of passenger comfort measured by passenger sensors located on the AV 1308. The passenger sensors include specialized sensors to record data such as facial expressions of the passenger, skin conductance, pulse and heart-rate, a temperature of the passenger's body, pupil dilation, and pressure on the AV seat arm rests. Each type of data can be recorded using a different sensor or a combination of different sensors, for example, heart rate monitors, a sphygmomanometer, a pupilometer, an Infrared thermometer, or a galvanic skin response sensor. The planning module 1336 determines the motion constraint based on an elevated heart rate or skin conductance level as detected by the passenger sensors.

In an embodiment, the constraints for operating the AV 1308 are ranked in a hierarchical order, where rank of each constraint corresponds to a level of navigational safety of the AV 1308. For example, a constraint that specifies a maximum speed limit of 50 mph is ranked lower than a constraint that specifies that the AV 1308 should speed up to avoid a collision with the vehicle 1316. The planning module 1336 may therefore temporarily violate a lower-ranking constraint in order to satisfy a higher-ranking constraint.

In one embodiment, the planning module 1336 generates an operational metric for a motion segment. Motion segments are discrete motions that a desired operation of the AV 1308 may be disaggregated into. For example, a desired operation may include exiting an intersection without a collision. A motion segment may include the AV 1308 traveling forward at 40 mph, or changing its directional orientation by 30°. The planning module 1336 generates an operational metric for a motion segment by determining a weighted aggregate of a number of violations of the constraints by the motion segment. For example, a constraint may specify that the AV 1308 should operate at a maximum speed of 50 mph and steer right at a maximum angle of 15°. The motion segment may include the AV 1308 operating at 25 mph but steering right at an angle of 20°. Therefore, the planning module 1336 will determine the number of violations as 1. To generate the operational metric, the planning module 1336 weights each violation of a constraint by a rank of the constraint. The operational metric for a motion segment may be expressed as $OM=\Sigma_i(R_i \times V_i)$, where $R_i$ denotes the rank of constraint i, and $V_i$ denotes whether the constraint i is violated by the motion segment. For example $V_i=0$, if the constraint i is not violated and $V_i=1$ if the constraint i is violated.

In one embodiment, the planning module 1336 generates a plurality of operational metrics for each motion segment. The operational metrics are generated using the corresponding number of violations of the constraints for the motion segment. For example, the operational metrics may be generated by grouping constraints according to their rank or their association with navigational safety. The operational metrics for a motion segment may be expressed as ($OM_1$, $OM_2$, $OM_3$), where $OM_1$ denotes a first operational metric based on navigational safety, $OM_2$ denotes a second operational metric based on traffic rules, and $OM_3$ denotes a third operational metric based on passenger comfort.

Each operational metric is ranked in a hierarchical order in accordance with an association of the operational metric with navigational safety of the vehicle. An operational metric that is associated with avoiding a collision of the AV 1308 with the vehicle 1316 is ranked higher than another operational metric that is associated with increasing the level of passenger comfort measured by the passenger sensors of the AV 1308. For example, the operational metric $OM_1$, which is based on navigational safety, is ranked higher than the operational metric $OM_2$, which is based on traffic rules. In turn, $OM_2$ is ranked higher than the operational metric $OM_3$, which is based on passenger comfort.

As described above, motion segments are discrete actions or motions that a desired operation of the AV 1308 may be disaggregated into. In one embodiment, the planning module 1336 receives, from the server 136, or generates using other methods, a plurality of motion segments for operating the AV 1308. The other methods for generating motion segments may include a grid-based search, an interval-based search, or a geometric algorithm for motion planning. For example, a motion segment may include a distance d for the AV 1308 to travel in a particular direction. In another example, a motion segment includes a directional orientation of the AV 1308 to avoid a collision with the vehicle 1316. A motion segment may include a trajectory between two spatiotemporal locations of the environment 1304. A motion segment may include a speed of the AV 1308 to avoid a collision of the AV 1308 with the vehicle 1316. For example, the planning module 1336 determines that the vehicle 1316 is about to cross the street at a crossing location $l_1$ that is a particular distance $d_1$ from the AV 1308 within $t_1$ seconds. A motion segment to avoid a collision motion may include a speed of the AV 1308 based on $(d_1/t_1)$, such that the AV 1308 can safely pass the crossing location hi before the vehicle 1316 crosses the street.

In one embodiment, the planning module 1336 determines a corresponding number of violations of the constraints for each motion segment. The planning module 1336 may simulate the operation of the AV 1308 to determine the corresponding number of violations for each motion segment. In other embodiments, the planning module 1336 may use methods based on input space discretization with collision checking, randomized planning, or constrained optimization and receding-horizon control to determine the corresponding number of violations for each motion segment.

The planning module extracts a feature vector from the constraints and the received sensor data 1352. The feature vector includes one or more features, which are compact, non-redundant representations of the constraints and the sensor data 1352. For example, the feature vector may include a feature describing a structure or shape of the vehicle 1316 that the visual sensors 1344 have identified. A feature of the extracted feature vector may include a spatiotemporal location (coordinates) of the vehicle 1316, a speed (e.g., 25 mph) of the vehicle 1316, or a directional orientation (North) of the vehicle 1316.

A feature extracted from the constraints may include a maximum speed limit for the AV 1308, a maximum acceleration limit of the AV 1308, or a maximum jerk of the AV 1308. The jerk of the AV 1308 refers to a rate of change of acceleration or the time derivative of acceleration of the AV 1308, expressed in $m/s^3$. The maximum speed limit, maximum acceleration, and maximum jerk of the AV 1308 correspond to a level of passenger comfort measured by the passenger sensors of the AV 1308. For example, if the acceleration of the AV 1308 is reduced, the level of passenger comfort typically increases. If the jerk of the AV 1308 increases, the level of passenger comfort typically decreases.

A feature of the extracted feature vector may represent whether the operating of the AV 1308 in accordance with a particular motion segment causes a traffic light violation. For example, a motion segment may require the AV 1308 to speed up and drive through a traffic light when the light turns red in order for the AV 1308 to avoid colliding with the vehicle 1316, which is driving straight at the AV 1308. In this case, the planning module 1336 determines that there is no other vehicle driving through the traffic light and that the AV 1308 may safely speed up and drive through the traffic light to avoid the collision. The motion segment causes a traffic light violation but avoid a collision with the vehicle 1316.

A feature of the extracted feature vector may represent a likelihood of a collision of the AV 1308 with the vehicle 1316 when traveling in accordance with a motion segment. For example, the planning module 1336 determines that the vehicle 1316 is about to cross the street at a crossing location $l_2$ that is a particular distance $d_2$ from the AV 1308 within $t_2$ seconds. The planning module 1336 estimates the speed and trajectory of the vehicle 1336. The planning module 1336 also determines the likelihood of collision for the AV 1308 with the vehicle 1316 if the vehicle 1316 continues at its current speed on its current trajectory. An example of the AV 1308 violating a lower-ranked constraint to avoid a collision with the vehicle 1316 is illustrated and described below with reference to FIG. 14.

A feature of the extracted feature vector may represent a level of passenger comfort measured by passenger sensors located on the AV 1308. The feature is associated with passenger comfort when the AV 1308 is traveling in accordance with a particular motion segment. For example, a constraint may specify that the passenger experiences a particular level of comfort when the AV 1308 is driving at less than 30 mph. If the motion segment includes a speed of 40 mph, the feature will represent that the passenger does not experience comfort when the AV 1308 is driving on the particular motion segment.

In one embodiment, the planning module 1336 extracts a feature vector from the constraints and the received motion segments. The feature vector includes a feature describing a lateral clearance of the AV 1308 to the vehicle 1316. The lateral clearance of the AV 1308 to the vehicle 1316 represents a likelihood of collision for the AV 1308 with the vehicle 1316. For example, if the lateral clearance is larger, the likelihood of collision for the AV 1308 with the vehicle 1316 will be smaller. The lateral clearance of the AV 1308 to the vehicle 1316 may also be used to determine a level of passenger comfort. For example, if the lateral clearance is larger, the passenger in the AV 1308 will be more comfortable. The feature vector is transmitted to a machine learning circuit of the AV 1308 to generate a motion segment 1312 for operating the AV 1308. The motion segment 1312 achieves the navigational objective of the AV 1308 while reducing the number of constraints violated and increasing the amount of passenger comfort provided.

The machine learning circuit may be part of the planning module 1336 or another component of the AV 1308. The machine learning circuit builds a model from training data that contains the inputs (constraints and sensor data 1352) and the desired outputs (motion segments). In one embodiment, the machine learning circuit generates the motion segment 1312 for the AV 1308, based on the feature vector, such that a number of violations of the constraints is below a threshold. The feature vector includes information about the position and location of the vehicle 1316. The machine learning circuit thus uses the feature vector to determine an optimal motion segment 1312 that will avoid a collision with the vehicle 1316 and simultaneously reduce the number of violations of the stored constraints. Information describing this motion segment 1312 is transmitted from the planning module 1336 to the control module 1340 to operate the AV 1308 while reducing the number of violations of the constraints.

In one embodiment, the machine learning circuit generates the hierarchical order for ranking the constraints based on the extracted feature vector. In this embodiment, the features of the feature vector represent the degree to which each constraint affects navigational safety. For example, a feature may represent that a particular constraint is not related to safety but only influences how comfortable the passenger feels. In this instance, the machine learning circuit will assign a lower rank to the particular constraint. The machine learning circuit is trained using data sets that include lists of motion constraints as inputs and a hierarchical ranking as outputs.

In one embodiment, the planning module 1336 receives a plurality of motion segments generated by other means, as described above. The machine learning circuit uses these motion segments and constraints as training data. The machine learning circuit is trained on determining which motion segments will violate a constraint as well as the priority or rank of the violated constraint. The machine learning model then generates the motion segment 1312 for the AV 1308. The number of violations of the constraints for the motion segment 1312 is lower than the corresponding number of violations of the constraints for each motion segment. Further details about the operation and training of the machine learning circuit are below with reference to FIG. 14.

The planning module 1336 aggregates the features of the extracted feature vector into a motion planning graph. Motion planning, as described above, is a process of disaggregating a desired operation, such as exiting an intersection without a collision, into discrete motions for the AV 1308. In one embodiment, the planning module 1336 receives a description of the desired operation for the AV 1308 and aggregates the constraints and the received motion segments into a motion planning graph. The motion planning graph is used to generate the motion segment 1312 to operate the AV 1308. The planning module 1336 traverses the motion planning graph to produce speed and turning commands for the AV 1308's throttle and steering.

In one embodiment, the motion planning graph is overlaid on a configuration space (spatiotemporal location, speed, directional orientation, etc.) for the AV 1308. Each configuration for the AV 1308 is associated with a vertex of the motion planning graph. From each vertex, the AV 1308 is allowed to move to adjacent vertices as long as the path between them avoids a collision with an object, for example, the vehicle 1316. The motion planning graph also includes a plurality of edges. Each edge corresponds to a motion segment. The planning module 1336 determines the corresponding number of violations for each constraint by identifying, for each motion segment, an edge of the motion planning graph corresponding to the motion segment. The planning module 1336 then determines a number of violations of the constraints associated with the identified edge. An example motion planning graph is illustrated and described above with reference to FIG. 10.

In one embodiment, the planning module 1336 uses the stored constraints and the received motion segments to generate a minimum-violation motion planning graph. Each edge of the minimum-violation motion planning graph is associated with a value of the operational metric of a corresponding motion segment. In one embodiment, the machine learning circuit uses the constraints, motion segments, and sensor data 1352 as training data, and generates the value of the operational metric of each corresponding motion segment of the plurality of edges of the motion planning graph based on the feature vector. For example, a constraint specifying a maximum speed of 60 mph for passenger comfort may be temporarily violated if a minimum speed constraint of 65 mph to avoid a collision is added to the minimum-violation motion planning graph. Therefore, the machine learning circuit will weigh the constraint specifying the maximum speed lower than the constraint specifying the minimum speed to avoid a collision.

In one embodiment, the machine learning circuit generates the motion segment 1312 by identifying, for each edge of the motion planning graph, a likelihood that operating the AV 1308 in accordance with a corresponding motion segment will cause the operational metric to be below the threshold. The machine learning circuit uses constraints as input and traverses the edges of the motion planning graph to determine the likelihood for each motion segment. In doing so, the machine learning circuit generates the motion segment 1312 by generating a new edge of the motion planning graph. The number of violations of the constraints associated with the new edge is lower than the corresponding number of violations of the constraints associated with each other edge of the motion planning graph.

In one embodiment, after the ranking of the constraints is complete, the machine learning circuit uses the feature vector (based on ranked constraints) to generate the motion segment 1312. The machine learning circuit selects the motion segment 1312 over another motion segment. The machine learning circuit optimizes its selection, such that operating the AV 1308 in accordance with the motion segment 1312 causes a violation of a first constraint having a higher rank. For example, the first constraint may specify that the AV 1308 should speed up to 65 mph to avoid a collision with the vehicle 1316. The machine learning determines that operating the AV 1308 in accordance with the other motion segment causes a violation of a second constraint having a lower rank. For example, the second constraints may specify that the maximum speed limit is 45 mph according to the traffic rules.

In one embodiment, the machine learning circuit generates a coefficient corresponding to each operational metric of the plurality of operational metrics described above. The coefficients are used to weight the operational metrics for each motion segment in order of their relationship to navigational safety. For example, a cost function for a motion segment may be expressed as $Cost = a_1 \times OM_1 + a_2 \times OM_2 + a_3 \times OM_3$, where $a_1$, $a_2$, and $a_3$ are the coefficients generated by the machine learning circuit based on its training using previous actions of the AV and the observed sensor data 1352. A higher value of a coefficient will weight a particular operational metric higher in the cost function and bias the planning module to avoid selecting a motion segment that violates a constraint associated with that operational metric. In another embodiment, the machine learning circuit uses the feature vector (extracted from the constraints and the motion segments) to generate the hierarchical order for ranking the operational metrics. In one embodiment, the planning module 1336 generates the motion segment 1312 by ranking a first operational metric (e.g., $OM_1$) that is associated with navigational safety higher than a second operational metric (e.g., $OM_2$) that is associated with passenger comfort. The machine learning circuit is used to optimize the operational metric $OM_1$ for the motion segment 1312.

The planning module 1336 further determines a speed, acceleration, or directional orientation for the AV 1308 using the minimum-violation motion planning graph, such that there are a minimum number of violations of the generated motion constraints. In one embodiment, sampling-based motion planning is used to perform model checking for the generated motion constraints based on the ranked hierarchy of motion constraints. The traversing of the minimum-violation motion graph results in a trajectory for the AV 1308 that maximizes a level of safety among several potential trajectories that satisfy the navigational objective. The generated trajectory includes the motion segment 1312.

In one embodiment, after the planning module 1336 receives the motion segments generated by other methods, the machine learning circuit generates a new motion segment based on features extracted from the constraints and the motion segments. The machine learning circuit attempts to minimize the number of violated constraints for the new motion segment. The planning module 1336 validates the operation of the machine learning circuit. The planning module 1336 determines whether the number of violated constraints for the new motion segment is in fact lower than that for each other received motion segment. The planning module 1336 constructs a group including the received motion segments and the new motion segment. From this group, the planning module 1336 selects an optimal motion segment for operating the AV 1308. The cost function, described above, or the plurality of operational metrics is optimized across the selected optimal motion segment. The planning module 1336 further generates a first score indicative of a likelihood that the selected optimal motion segment is in fact the new motion segment generated by the machine learning circuit. The first score is used to validate the quality and convergence of the machine learning circuit. The machine learning circuit is trained, as described below with reference to FIG. 14, using the generated first score to generate the motion segment 1312 that optimizes the operational metrics. This motion segment 1312 that optimizes the operational metrics has a number of violations of the constraints lower than the corresponding number of violations for other motion segments.

In one embodiment, the machine learning circuit, generates the motion segment 1312 by first generating a second score for each received motion segment. The second score is indicative of a likelihood that the number of violations of the constraints for a motion segment is lower than the number of violations of the constraints for each other motion segment of the received motion segments. In this manner, the machine learning circuit can simply select the received motion segment having the highest score. The second scores may also be used to validate the operation of the machine learning circuit. The machine learning circuit is also trained, using the score and the received motion segments, to generate the motion segment 1312. The training configures the machine learning circuit, such that a number of violations of the constraints for the motion segment 1312 is lower than the corresponding number of violations of the constraints for each received motion segment.

In one embodiment, sampling-based motion planning is used to perform model checking for the ranked hierarchy of motion constraints. The planning module 1336 samples the constraints and the sensor data 1352 to generate the motion segment 1312. Operating the AV 1308 in accordance with the motion segment 1312 causes the operational metric OM to be below a threshold. In one embodiment, the sampling includes traversing the minimum-violation motion graph to generate a trajectory for the AV 1308. The trajectory maximizes a level of safety among several potential trajectories that satisfy the navigational objective. The generated trajectory includes the motion constraint 1312.

The control module 1340 operates the AV 1308 in accordance with the generated motion segment 1312. The control module 1340 uses the motion segment 1312 from the planning module 1336 to operate the brakes 420c, steering 420a, and throttle 420b (illustrated and described above with reference to FIG. 4) of the AV 1308. The operating of the AV 1308 can include violating a lower-priority constraint, for example, a maximum acceleration constraint that is based on providing a level of passenger comfort. In one embodiment, the control module 1340 operates the AV 1308 within a discretized drivable area in accordance with the motion segment 1312 while performing collision checking or probabilistically exploring the drivable area around the vehicle 1316. In another embodiment, if the vehicle 1316 is moving, the control module 1340 infers the vehicle 1320's intention from its motion, such as giving way or acting aggressively. Based on the motion segment 1312, the control module 1340 operates the steering control 102, brakes 103, gears, or accelerator pedal if a predicted time to collision with the vehicle 1316 falls below a threshold.

Among the benefits and advantages of the embodiments disclosed herein are that different and complex motion segments can be generated and evaluated by an AV system to minimize operational cost, minimize the number of traffic rules temporarily violated, and prevent collisions. The disclosed embodiments increase navigational safety for the AV as well as for pedestrians and other vehicles. By ranking motion constraints in a hierarchical order in accordance with navigational safety, the AV can select a lower-priority rule to temporarily violate in order to increase vehicular safety. Operating the AV using the disclosed embodiments results in increased passenger comfort, increased passenger and pedestrian safety, lower wear and tear on the AV, reduced travel time, a reduced travel distance, etc. Increased safety for other vehicles on the road network is also achieved.

Example of Constraint Violation for Collision Avoidance

Figure 14:
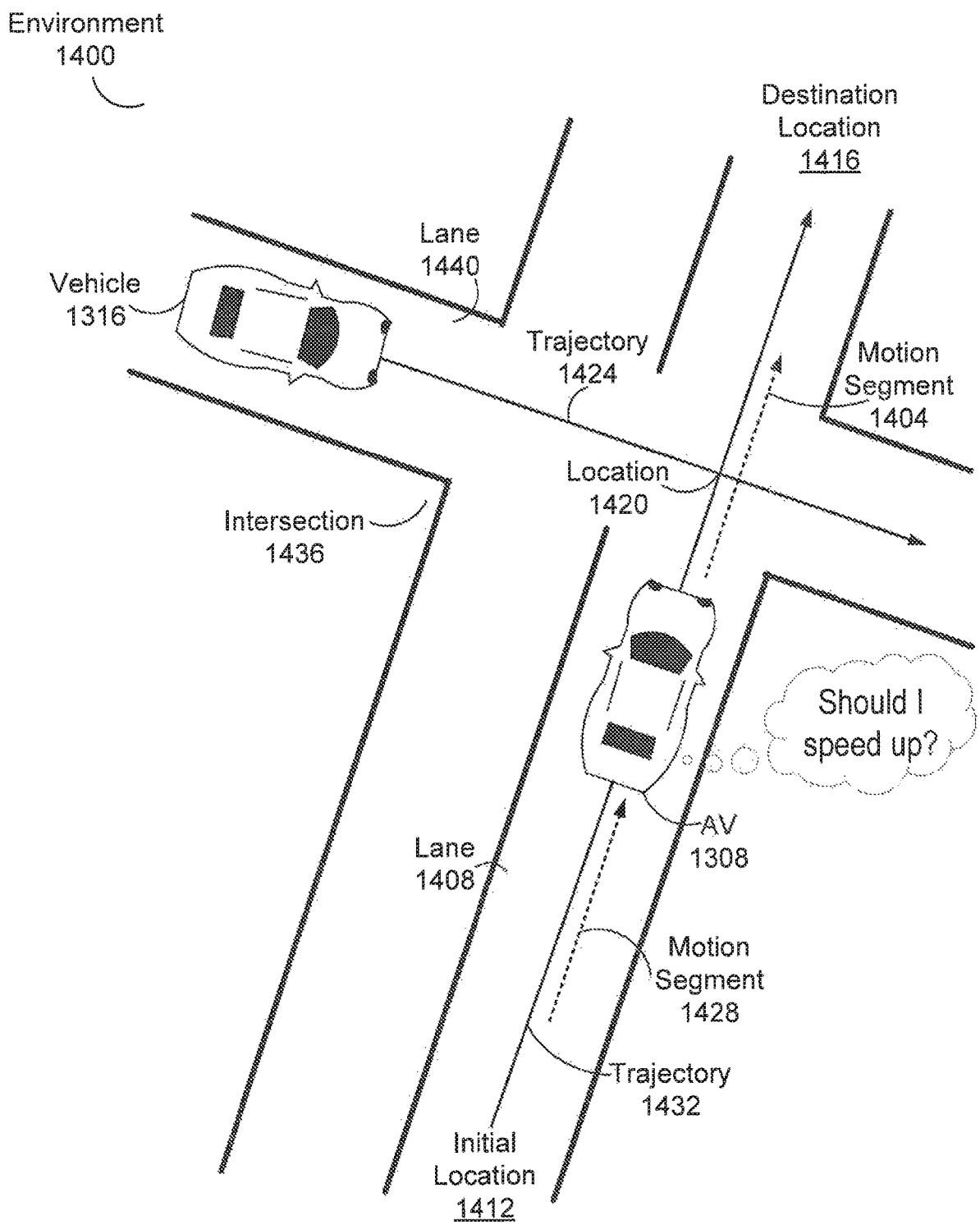
FIG. 14 illustrates an example of violation of a lower-ranked constraint by a vehicle to avoid a collision with an object, in accordance with one or more embodiments.

FIG. 14 illustrates an example of a violation of a lower-ranked constraint by the AV 1308 to avoid a collision with the vehicle 1316, in accordance with one or more embodiments. FIG. 14 depicts an environment 1400, in which the AV 1308 and the vehicle 1316 are both driving. The AV 1308 begins driving in a lane 1408 from an initial location 1412 in accordance with a trajectory 1432 towards a destination location 1416. The planning module 1336 of the AV 1308 stores a first constraint for operating the AV 1308 that specifies that the AV 1308 should not collide with another object. The maximum speed limit of lane 1408 is 55 mph. The planning module 1336 also stores a second constraint corresponding to the maximum speed limit of 55 mph for operating the AV 1308. The first constraint (avoiding a collision) is ranked higher than the second constraint (obeying the speed limit). The planning module 1336 generates the motion segment 1428 for operating the AV 1308 to satisfy the stored first and second constraints. The motion segment 1428 specifies the directional orientation of the AV 1308 (towards the destination location 1416) as well as a speed of 50 mph. The AV 1308 therefore operates in accordance with the motion segment 1428.

The AV 1308 approaches an intersection 1436 in the lane 1408 ahead of the AV 1308. Meanwhile, the vehicle 1316 is also driving towards the intersection 1436 in accordance with a trajectory 1424 in a lane 1440 at right angles to lane 1408. The visual sensors 1344 of the AV 1308 generate sensor data 1352 describing the environment 1400 and sense the presence and motion of the vehicle 1316. Based on the sensor data 1352 generated by the visual sensors 1344, the planning module 1336 of the AV 1308 determines that the vehicle 1316 is driving towards the intersection 1436 in accordance with the trajectory 1424. The planning module 1336 further determines that, based on the speed of the vehicle 1316 and the motion segment 1428, there is a likelihood of collision for the AV 1308 with the vehicle 1316 that is above a threshold. The planning module 1336 further determines that the AV 1308 and the vehicle 1316 are likely to collide at a location 1420 where the trajectories 1424, 1432 intersect. The planning module determines the point and time of the intersection.

The planning module 1336 extracts a feature vector from the stored constraints and the received sensor data 1352. The feature vector includes features describing the size, shape, speed, and direction of the vehicle 1316. A machine learning circuit of the AV 1308 generates a new motion segment 1404, based on the feature vector, such that a number of violations of the stored constraints is minimized. The machine learning circuit estimates that there are two options for the AV 1308: to slow down to avoid a collision or to speed up. The machine learning circuit, having been trained using stored behavior of the AV 1308 determines that the AV 1308 is too close to the location 1420, and therefore will be unable to slow down sufficiently to avoid the collision. The machine learning circuit determines that increasing the AV 1308's speed to 60 mph and driving faster through the intersection 1436 will avoid the collision but temporarily violate the second constraint, which specifies a maximum speed of 55 mph. Because the first constraint is ranked higher than the second constraint, the machine learning circuit temporarily violates the second constraint in order to satisfy the first constraint (avoiding the collision). Therefore, the machine learning circuit generates the motion segment 1404 that specifies a speed of 60 mph for the AV 1308.

The control module 1340 of the AV 1308 operates the AV 1308 in accordance with the motion segment 1404, such that the AV 1308 safely drives through the intersection 1436 and avoids a collision with the vehicle 1316.

Machine Learning Architecture for Motion Planning

Figure 15:
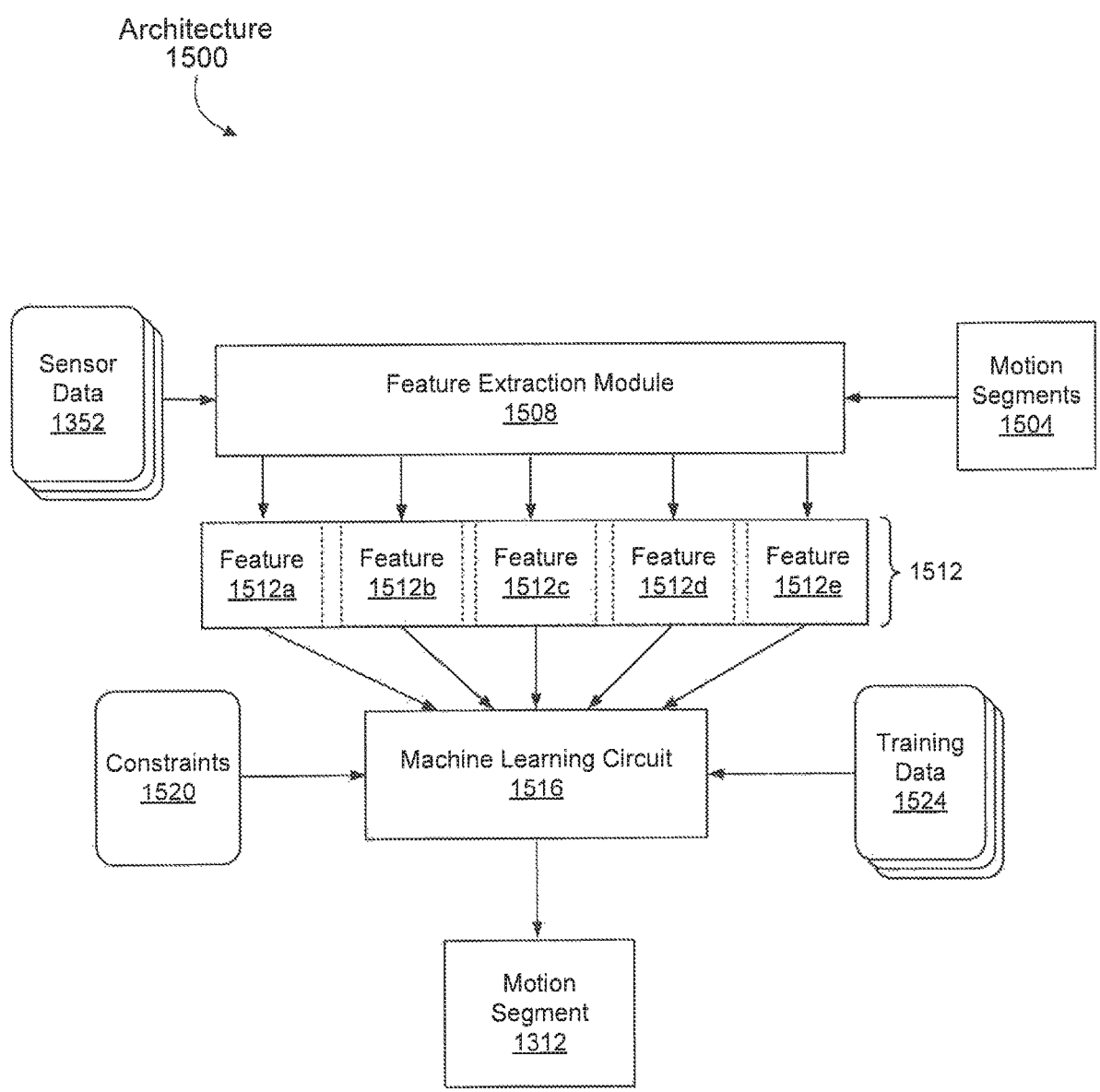
FIG. 15 illustrates a block diagram of a machine learning architecture for operation of a vehicle, in accordance with one or more embodiments.

FIG. 15 illustrates a block diagram of a machine learning architecture 1500 for the AV 1308 for motion planning, in accordance with one or more embodiments. The architecture 1500 includes a feature extraction module 1508 and a machine learning circuit 1516. In other embodiments, the architecture 1500 includes additional or fewer components than those described herein. Similarly, the functions can be distributed among the components and/or different entities in a different manner than is described here.

Referring to FIGS. 13 and 15, the feature extraction module 1508 extracts the feature vector 1512 from the sensor data 1352, the received motion segments 1504, and the constraints. The feature vector 1512 describes the position and speed of the vehicle 1316 as well as the different possible paths the AV 1308 can take. A feature 1512a represents a spatiotemporal location of the vehicle 1316. If the position of the vehicle 1316 is too close to the AV 1308, the machine learning circuit 1516 generates a motion segment 1312 to avoid a collision. A feature 1512b represents a speed of the vehicle 1316. If the vehicle 1316 is speeding away from the AV 1308, the machine learning circuit generates the motion segment 1312 to minimize cost, for example, increase passenger comfort.

A feature 1512c represents a directional orientation of the vehicle 1316. If the vehicle 1316 is headed towards the AV 1308, the machine learning circuit 1516 will select the motion segment 1312, such that the AV 1308 drives away. A feature 1512d represents whether operating the AV 1308 in accordance with one of the motion segments 1504 causes a traffic light violation. If there is no higher-ranked constraint to satisfy, the machine learning circuit 1516 will avoid violating the constraint represented by the feature 1512d. A feature 1512e represents a likelihood of a collision of the AV 1308 with the vehicle 1316 when traveling in accordance with a motion segment. If the feature 1512e illustrates that the likelihood of a collision is low, the machine learning circuit 1516 may select that motion segment. In one embodiment, the feature extraction module 1508 applies dimensionality reduction (e.g., via linear discriminant analysis (LDA), principle component analysis (PCA), or the like) to reduce the amount of data in the feature vector 1512 to a smaller, more representative set of data.

The machine learning circuit 1516 is trained using the feature vector 1512, training data 1524, and the constraints 1520. The training data 1524 includes stored operations of the AV 1308, such as the choices the AV 1308 made when presented with an option of several motion segments. In one embodiment, the machine learning circuit 1516 is thereby configured to generate the motion segment 1312, such that a number of violations of the constraints 1520 is lower than the corresponding number of violations for each received motion segment. In another embodiment, the machine learning circuit 1516 is configured to generate the motion segment 1312, such that operating the AV 1308 in accordance with the motion segment 1312 reduces the operational metric OM.

In one embodiments, when applied to features of received motion segments, the machine learning circuit 1516 estimates whether the motion segments optimize the operational metric OM. As part of the training of the machine learning circuit 1516, a training set of features and training data 1524 is formed by identifying a first training set of features that have been determined to have the property in question (optimizing the operational metric OM), and, in some embodiments, forms a second training set of features that lack the property in question.

In an embodiment, supervised machine learning is used to train the machine learning circuit 1516 with the feature vector 1512 of the first and the second training sets. In other embodiments, different machine learning techniques, such as deep learning, neural networks, linear support vector machine (linear SVM), boosting for other algorithms (e.g., ADABOOST™), logistic regression, naïve Bayes, memory-based learning, random forests, bagged trees, decision trees, boosted trees, or boosted stumps, may be used.

Process for Motion Planning Using Machine Learning

FIG. 16 illustrates a process 1600 for operation of the AV 1308 using machine learning with motion planning, in accordance with one or more embodiments. In one embodiment, the process of FIG. 1600 is performed by the planning module 1336. Other entities, for example, one or more components of the AV 1308 or the server 136 perform some or all of the steps of the process 1600 in other embodiments. Likewise, embodiments may include different and/or additional steps, or perform the steps in different orders.

The AV 1308 stores 1604, using one or more processors, constraints 1520 for operating the AV 1308 within an environment 1304. Each constraint limits the operation of the AV 1308. For example, a constraint may be a maximum speed limit for the AV 1308 based on a traffic rule. Another constraint may specify that the AV 1308 must stop at red lights. The planning module 1336 may receive one or more constraints from the server 136 that are intended to increase a level of passenger comfort measured by passenger sensors of the AV 1308.

The AV 1308 receives 1608, using one or more sensors 1344, sensor data 1352 describing the environment 1304. In one embodiment, the sensor data 1352 includes LiDAR point cloud data or camera images. For example, LiDAR sensors of the AV 1308 are used to illuminate a target, for example, the vehicle 1316, with pulsed laser light and measure the reflected pulses. Differences in laser return times and wavelengths can then be used to generate the sensor data 1352 and create a digital 3-D representation of the vehicle 1316.

The AV 1308 extracts 1612, using the one or more processors, a feature vector 1512 from the constraints 1520 and the received sensor data 1352. The feature vector 1512 includes a feature 1512a describing the vehicle 1316. The feature 1512a represents a spatiotemporal location of the vehicle 1316. If the position of the vehicle 1316 is too close to the AV 1316, the machine learning circuit 1516 generates a motion segment 1312 to avoid a collision.

The AV 1308 generates 1616, using the machine learning circuit 1516, a motion segment 1312 based on the feature vector 1512. A number of violations of the constraints 1520 for the motion segment 1312 is below a threshold. In one embodiment, the machine learning circuit 1516 is configured to generate the motion segment 1312, such that a number of violations of the constraints 1520 is lower than the corresponding number of violations of the constraints 1520 for each motion segment. In another embodiment, the machine learning circuit 1516 is configured to generate the motion segment 1312, such that operating the AV 1308 in accordance with the motion segment 1312 reduces the operational metric OM.

The AV 1308 operates 1620, using the one or more processors, in accordance with the generated motion segment 1312.

Alternate Process for Motion Planning Using Machine Learning

FIG. 17 illustrates an alternate process 1700 for operation of the AV 1308 using machine learning with motion planning, in accordance with one or more embodiments. In one embodiment, the process of FIG. 1700 is performed by the planning module 1336. Other entities, for example, one or more components of the AV 1308 or the server 136 perform some or all of the steps of the process 1700 in other embodiments. Likewise, embodiments may include different and/or additional steps, or perform the steps in different orders.

The AV 1308 stores 1704, using one or more processors, a plurality of constraints 1520 for operating the vehicle. Each constraint limits the operation of the AV 1308. For example, a constraint may specify a maximum speed limit for the AV 1308 based on a traffic rule. Another constraint may specify that the AV 1308 must stop at red lights. The planning module 1336 may receive one or more constraints from the server 136 that are intended to increase a level of passenger comfort measured by passenger sensors of the AV 1308.

The AV 1308 receives 1708, using the one or more processors, a plurality of motion segments 1504 for operating the AV 1308. Each motion segment specifies an action for the AV 1308. For example, a first motion segment of the plurality of motion segments 1504 may include a distance for the AV 1308 to travel or a speed for the AV 1308 to operate at.

For each motion segment of the received plurality of motion segments 1504, the AV 1308 determines 1712 a corresponding number of violations of the stored plurality of constraints 1520. A motion segment violates a constraint when it directs the AV 1308 to act contrary to the constraint. For example, the constraint may specify that the maximum speed for the AV 1308 should be 30 mph, while the motion segment specifies an operating speed of 60 mph for the AV 1308. The AV 1308 may temporarily violate a lower-ranked constraint, for example, providing a comfortable ride, in order to satisfy a higher-ranked constraint, for example, avoiding a collision with the vehicle 1316.

The AV 1308 generates 1716, using the machine learning circuit 1516, a second motion segment from the stored plurality of constraints 1520 and the received plurality of motion segments 1504. A number of violations of the constraints 1520 for the second motion segment is lower than the corresponding number of violations of the constraints 1520 for each motion segment of the received plurality of motion segments 1504. The AV 1308 thus achieves its navigational objective while minimizing the number of constraints that it violates.

The AV 1308 operates 1720, using the one or more processors, the AV 1308 in accordance with the second motion segment.

Additional Embodiments

In one embodiment, one or more processors of a vehicle store multiple constraints for operating the vehicle. The one or more processors receive multiple motion segments for operating the vehicle. At least a first motion segment includes a distance for the vehicle to travel. For each motion segment, a corresponding number of violations of the stored constraints are determined. A machine learning circuit generates a second motion segment from the stored constraints and the received motion segments. The machine learning circuit determines that a number of violations of the constraints for the second motion segment is lower than the corresponding number of violations of the constraints for each motion segment of the received motion segments. The one or more processors operate the vehicle in accordance with the second motion segment.

In one embodiment, the one or more processors aggregate the stored constraints and the received motion segments into a motion planning graph.

In one embodiment, the determining of the corresponding number of violations of the stored constraints includes identifying, for each motion segment, an edge of the motion planning graph corresponding to the motion segment. A number of violations of the stored constraints associated with the identified edge is determined.

In one embodiment, the second motion segment generated by the machine learning circuit corresponds to a second edge of the motion planning graph. A number of violations of the stored constraints associated with the second edge is lower than the corresponding number of violations of the stored constraints associated with each other edge of the motion planning graph.

In one embodiment, operational metrics are generated for each motion segment based on the corresponding number of violations of the stored constraints.

In one embodiment, the machine learning circuit generates a coefficient corresponding to each operational metric from the stored constraints and the received motion segments.

In one embodiment, each operational metric is ranked in a hierarchical order in accordance with an association of the operational metric with navigational safety of the vehicle.

In one embodiment, a first operational metric that is associated with avoiding a collision of the vehicle with an object is ranked higher than a second operational metric that is associated with increasing the level of passenger comfort measured by the passenger sensors of the vehicle.

In one embodiment, the machine learning circuit generates the hierarchical order for ranking the operational metrics based on the stored constraints and the received motion segments.

In one embodiment, the generating of the second motion segment includes ranking a third operational metric that is associated with navigational safety higher than a fourth operational metric that is not associated with navigational safety. The machine learning circuit reduces the third operational metric for the second motion segment.

In one embodiment, a third motion segment for operating the vehicle is identified from a group including the received motion segments and the second motion segment. The operational metrics are reduced across the identified third motion segment.

In one embodiment, a score is generated indicative of a likelihood that the identified third motion segment includes the second motion segment. The machine learning circuit is trained using the generated score to generate a fourth motion segment. A number of violations of the stored constraints corresponding to the generated fourth motion segment is lower than the corresponding number of violations of the stored constraints for each motion segment of the received motion segments.

In one embodiment, the generating of the second motion segment includes generating a score for each motion segment of the received motion segments. The score is indicative of a likelihood that the corresponding number of violations of the stored constraints for the motion segment is lower than the corresponding number of violations of the stored constraints for each other motion segment of the received motion segments.

In one embodiment, the generating of the second motion segment includes extracting a feature vector from the stored constraints and the received motion segments. The feature vector includes at least a first feature describing a lateral clearance of the vehicle to an object when operating the vehicle in accordance with a fifth motion segment. The one or more processors transmit the feature vector to the machine learning circuit to generate the second motion segment.

In one embodiment, the machine learning circuit is trained based on the received motion segments to generate a sixth motion segment for operating the vehicle. A number of violations of the stored constraints for the sixth motion segment is lower than the corresponding number of violations of the stored constraints for each motion segment of the received motion segments.

In one embodiment, a second feature of the feature vector includes a likelihood of a collision of the vehicle with an object when traveling in accordance with a seventh motion segment.

In one embodiment, a third feature of the feature vector includes a level of passenger comfort when the vehicle is traveling in accordance with a eighth motion segment of the received motion segments. The level of passenger comfort is measured by passenger sensors located on the vehicle.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method comprising:
    storing, using one or more processors of an autonomous vehicle located within an environment, a plurality of constraints for operating the autonomous vehicle within the environment;
    receiving, using one or more sensors of the autonomous vehicle, sensor data describing the environment;
    receiving, using one or more additional sensors of the autonomous vehicle, additional sensor data describing one or more physical characteristics of a passenger of the autonomous vehicle other than a driver of the autonomous vehicle; and
    extracting, using the one or more processors, a feature vector from the stored plurality of constraints, the received sensor data, and the received additional sensor data, wherein the feature vector comprises:
        a first feature describing an object located within the environment,
        a second feature describing the one or more physical characteristics of the passenger of the autonomous vehicle,
        a third feature describing a current operation of the vehicle;
    determining, using the one or more processors, a hierarchical ranking of the stored plurality of constraints based on the feature vector, including the first feature, the second feature, and the third feature, wherein a rank of each constraint of the stored plurality of constraints corresponds to a level of navigational safety of the autonomous vehicle;
generating, using the one or more processors, a first motion segment based on (i) the feature vector including the first feature, the second feature, and the third feature and (ii) the hierarchical ranking of the stored plurality of constraints, such that a number of violations of the stored plurality of constraints is below a threshold, wherein the generated first motion segment comprises at least one of:
a trajectory between two spatiotemporal locations of the environment, or
a speed of the autonomous vehicle to avoid a collision of the autonomous vehicle with the object; and
causing, using the one or more processors, the autonomous vehicle to autonomously traverse to a destination in accordance with the generated first motion segment.

2. The method of claim 1, wherein the generated first motion segment further comprises a directional orientation of the autonomous vehicle to avoid a collision with the object.

3. The method of claim 1, wherein the first feature of the extracted feature vector comprises at least one of:
a spatiotemporal location of the object;
a speed of the object; or
a directional orientation of the object.

4. The method of claim 1, wherein:
a fourth feature of the extracted feature vector comprises at least one of a maximum speed of the autonomous vehicle, a maximum acceleration of the autonomous vehicle, or a maximum jerk of the autonomous vehicle; and
the at least one of the maximum speed, the maximum acceleration, or the maximum jerk correspond to a level of passenger comfort measured by one or more passenger sensors of the autonomous vehicle.

5. The method of claim 1, wherein a fifth feature of the extracted feature vector represents whether the causing of the autonomous vehicle to autonomously transverse to the destination in accordance with the first motion segment causes a traffic light violation.

6. The method of claim 1, further comprising:
aggregating, using the one or more processors, a plurality of features of the extracted feature vector into a motion planning graph, wherein:
the motion planning graph comprises a plurality of edges; and
each edge of the plurality of edges corresponds to a motion segment of the received plurality of motion segments.

7. The method of claim 6, wherein the generating, based on the feature vector, of the first motion segment comprises:
selecting, using the one or more processors, the first motion segment corresponding to a first edge of the plurality of edges over a second motion segment corresponding to a second edge of the plurality of edges, wherein:
causing the autonomous vehicle to autonomously traverse to the destination in accordance with the first motion segment causes a violation of a first constraint having a higher rank; and
causing the autonomous vehicle to autonomously traverse to the destination in accordance with the second motion segment causes a violation of a second constraint having a lower rank.

8. The method of claim 6, wherein:
the motion planning graph comprises a minimum-violation motion planning graph; and
each edge of the plurality of edges is associated with a value of an operational metric of a corresponding motion segment.

9. The method of claim 8, further comprising generating, using a machine learning circuit, the value of the operational metric of each corresponding motion segment of the plurality of edges of the motion planning graph based on the feature vector.

10. The method claim 9, wherein the generating of the first motion segment comprises identifying, using the machine learning circuit, for each edge of the plurality of edges of the motion planning graph, a likelihood that the causing of the autonomous vehicle to autonomously traverse to the destination in accordance with a corresponding motion segment causes the operational metric to be below the threshold.

11. The method of claim 8, further comprising sampling, using the one or more processors, the stored plurality of constraints and the received sensor data to generate a third motion segment for operating the autonomous vehicle within the environment, wherein the operating of the autonomous vehicle in accordance with the third motion segment causes the operational metric associated with operating the autonomous vehicle to be below the threshold.

12. The method of claim 8, wherein:
the operational metric further comprises a weighted aggregate of a number of violations of the stored plurality of constraints; and
each violation of a constraint of the stored plurality of constraints is weighted by a rank of the constraint.

13. The method of claim 1, wherein the additional sensor data comprises at least one of:
a heart rate of the passenger,
a temperature of the passenger, or
a pupil dilation of the passenger.

14. The method of claim 1, wherein the additional sensor data comprises at least one of:
a facial expressions of the passenger, or
a skin conductance of the passenger.

15. The method of claim 1, wherein the additional sensor data comprises a pressure applied to a seat arm rest of the vehicle by the passenger.

16. An autonomous vehicle comprising:
one or more computer processors; and
one or more non-transitory storage media storing instructions which, when executed by the one or more computer processors, cause the one or more computer processors to:
store a plurality of constraints for operating the autonomous vehicle within an environment;
receive, using one or more sensors of the autonomous vehicle, sensor data describing the environment;
receive, using one or more additional sensors of the autonomous vehicle, additional sensor data describing one or more physical characteristics of a passenger of the autonomous vehicle other than a driver of the autonomous vehicle;
extract a feature vector from the stored plurality of constraints, the received sensor data, and the received additional sensor data, wherein the feature vector comprises:
a first feature describing an object located within the environment, a second feature describing the one or more physical characteristics of the passenger of the autonomous vehicle, and a third feature describing a current operation of the vehicle;

determining a hierarchical ranking of the stored plurality of constraints based on the feature vector, including the first feature, the second feature, and the third feature, wherein a rank of each constraint of the stored plurality of constraints corresponds to a level of navigational safety of the autonomous vehicle;

generate a first motion segment based on (i) the feature vector including the first feature, the second feature, and the third feature and (ii) the hierarchical ranking of the stored plurality of constraints, such that a number of violations of the stored plurality of constraints is below a threshold, wherein the generated first motion segment comprises at least one of:

a trajectory between two spatiotemporal locations of the environment, or a speed of the autonomous vehicle to avoid a collision of the autonomous vehicle with the object; and causing the autonomous vehicle to autonomously traverse to a destination in accordance with the generated first motion segment.

17. The autonomous vehicle of claim 16, wherein the generated first motion segment further comprises a directional orientation of the autonomous vehicle to avoid a collision with the object.

18. The autonomous vehicle of claim 16, wherein the first feature of the extracted feature vector comprises at least one of a spatiotemporal location of the object, a speed of the object, or a directional orientation of the object.

19. One or more non-transitory storage media storing instructions which, when executed by one or more computing devices, cause the one or more computing devices to:

store a plurality of constraints for operating an autonomous vehicle within an environment;

receive, using one or more sensors of the autonomous vehicle, sensor data describing the environment;

receive, using one or more additional sensors of the autonomous vehicle, additional sensor data describing one or more physical characteristics of a passenger of the autonomous vehicle other than a driver of the autonomous vehicle;

extract a feature vector from the stored plurality of constraints, the received sensor data, and the received additional sensor data, wherein the feature vector comprises:

a first feature describing an object located within the environment, a second feature describing the one or more physical characteristics of the passenger of the autonomous vehicle, and a third feature describing a current operation of the vehicle;

determining a hierarchical ranking of the stored plurality of constraints based on the feature vector, including the first feature, the second feature, and the third feature, wherein a rank of each constraint of the stored plurality of constraints corresponds to a level of navigational safety of the autonomous vehicle;

generate a first motion segment based on (i) the feature vector including the first feature, the second feature, and the third feature and (ii) the hierarchical ranking of the stored plurality of constraints, such that a number of violations of the stored plurality of constraints is below a threshold, wherein the generated first motion segment comprises at least one of:

a trajectory between two spatiotemporal locations of the environment, or a speed of the autonomous vehicle to avoid a collision of the autonomous vehicle with the object; and causing the autonomous vehicle to autonomously traverse to a destination in accordance with the generated first motion segment.

20. The one or more non-transitory storage media of claim 19, wherein the generated first motion segment further comprises a directional orientation of the autonomous vehicle to avoid a collision with the object.

* * * * *

UNITED STATES PATENT AND TRADEMARK OFFICE
CERTIFICATE OF CORRECTION

PATENT NO. : 11,899,464 B2  Page 1 of 1
APPLICATION NO. : 16/704366
DATED : February 13, 2024
INVENTOR(S) : Sourabh Vora et al.

It is certified that error appears in the above-identified patent and that said Letters Patent is hereby corrected as shown below:

On the Title Page

Item (72), delete "Marina Del Ray" and insert -- Marina Del Rey --

In the Claims

Claim 11, Column 32, Line 12, after "method" insert -- of --

Signed and Sealed this
Twenty-first Day of January, 2025

Coke Morgan Stewart
*Acting Director of the United States Patent and Trademark Office*